(12) United States Patent
Hirota

(10) Patent No.: US 10,291,867 B2
(45) Date of Patent: May 14, 2019

(54) SOLID-STATE IMAGING ELEMENT AND DRIVING METHOD AND ELECTRONIC EQUIPMENT

(71) Applicant: Sony Semiconductor Solutions Corporation, Kanagawa (JP)

(72) Inventor: Isao Hirota, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/740,556

(22) PCT Filed: Jun. 24, 2016

(86) PCT No.: PCT/JP2016/068755
§ 371 (c)(1),
(2) Date: Dec. 28, 2017

(87) PCT Pub. No.: WO2017/006781
PCT Pub. Date: Jan. 12, 2017

(65) Prior Publication Data
US 2018/0191973 A1    Jul. 5, 2018

(30) Foreign Application Priority Data

Jul. 8, 2015    (JP) .................................. 2015-136842

(51) Int. Cl.
*H04N 5/355* (2011.01)
*H04N 5/3745* (2011.01)
*H04N 5/359* (2011.01)
*H04N 5/374* (2011.01)

(52) U.S. Cl.
CPC ......... *H04N 5/35563* (2013.01); *H04N 5/355* (2013.01); *H04N 5/3559* (2013.01);
(Continued)

(58) Field of Classification Search
CPC .. H04N 5/35563; H04N 5/3592; H04N 5/374; H04N 5/355
See application file for complete search history.

(56) References Cited

U.S. PATENT DOCUMENTS

| | | | |
|---|---|---|---|
| 2005/0110093 A1* | 5/2005 | Altice, Jr. ......... | H01L 27/14609 257/359 |
| 2008/0055441 A1* | 3/2008 | Altice ................ | H04N 5/35527 348/297 |

(Continued)

FOREIGN PATENT DOCUMENTS

| | | |
|---|---|---|
| JP | 3071891 B2 | 5/2000 |
| JP | 2006-253876 A | 9/2006 |

(Continued)

OTHER PUBLICATIONS

Written Opinion and English translation thereof dated Aug. 16, 2016s in connection with International Application No. PCT/JP2016/068755.

(Continued)

*Primary Examiner* — Ahmed A Berhan
(74) *Attorney, Agent, or Firm* — Wolf, Greenfield & Sacks, P.C.

(57) ABSTRACT

The present technique relates to a solid-state imaging element and a driving method and electronic equipment that enable sufficient extension of the dynamic range and obtention of an image with higher quality. In a unit pixel, a first photoelectric converter and a second photoelectric converter are provided. Furthermore, a charge accumulating part is connected to the second photoelectric converter with the intermediary of a second transfer gate part and a charge obtained by photoelectric conversion in the second photoelectric converter is transferred to the charge accumulating part via the second transfer gate part. Moreover, an anti- (Continued)

blooming gate part is connected to the second photoelectric converter and the second photoelectric converter can be reset.

7 Claims, 14 Drawing Sheets

(52) U.S. Cl.
CPC ............ *H04N 5/3592* (2013.01); *H04N 5/374* (2013.01); *H04N 5/37452* (2013.01)

(56) References Cited

U.S. PATENT DOCUMENTS

| | | |
|---|---|---|
| 2012/0235021 A1 | 9/2012 | Kasai |
| 2014/0139717 A1* | 5/2014 | Short .................... H04N 7/142 348/333.1 |
| 2015/0076355 A1 | 3/2015 | Grauer et al. |
| 2016/0073088 A1* | 3/2016 | Cohen ............... H01L 27/14627 348/46 |

FOREIGN PATENT DOCUMENTS

| | | |
|---|---|---|
| JP | 2012-195734 A | 10/2012 |
| JP | 2015-518692 A | 7/2015 |
| WO | WO 2014/133843 A1 | 9/2014 |

OTHER PUBLICATIONS

International Preliminary Report on Patentability and English translation thereof dated Jan. 18, 2018 in connection with International Application No. PCT/JP2016/068755.

International Search Report and English translation thereof dated Aug. 8, 2016 in connection with International Application No. PCT/JP2016/068755.

* cited by examiner

SOLID-STATE IMAGING ELEMENT AND DRIVING METHOD AND ELECTRONIC EQUIPMENT

CROSS-REFERENCE TO RELATED APPLICATIONS

This application is a National Stage of International Application No. PCT/JP2016/068755, filed in the Japanese Patent Office as a Receiving office on Jun. 24, 2016, which claims priority to Japanese Patent Application Number 2015-136842, filed in the Japanese Patent Office on Jul. 8, 2015, each of which is hereby incorporated by reference in its entirety.

TECHNICAL FIELD

The present technique relates to a solid-state imaging element and a driving method and electronic equipment and particularly relates to a solid-state imaging element and a driving method and electronic equipment that are enabled to sufficiently extend the dynamic range and obtain an image with higher quality.

BACKGROUND ART

In the past, a technique called HDR (High Dynamic Range) rendering in which the dynamic range of an image is extended in photographing of the image has been known.

As such a technique, for example a technique has been proposed in which light receiving elements different in the sensitivity are provided and the dynamic range is extended by combining plural images obtained by photographing by each of these light receiving elements (for example, refer to PTL 1 and PTL 2).

Furthermore, a technique in which the dynamic range is extended by combining an image obtained through long-time exposure and an image obtained through short-time exposure and a technique in which the dynamic range is extended by providing additional capacitance for a light receiving element to increase the amount of charge that can be accumulated have also been proposed.

Moreover, there is also a technique in which, instead of only providing light receiving elements different in the sensitivity, the sensitivity ratio that is insufficient with only the sensitivity difference between these light receiving elements is supplemented by controlling the exposure time of the light receiving elements.

CITATION LIST

Patent Literature

[PTL 1]
  Japanese Patent No. 3071891
[PTL 2]
  JP 2006-253876A

SUMMARY

Technical Problems

However, with the above-described techniques, it is difficult to sufficiently extend the dynamic range and obtain an image with high quality.

For example, in the case of extending the dynamic range by using only light receiving elements different in the sensitivity, if the distance between these light receiving elements is short, color crosstalk increases between the light receiving elements and therefore it is difficult to obtain a sufficient sensitivity ratio between the light receiving elements in terms of the structure. In this case, it becomes impossible to sufficiently extend the dynamic range. In addition, in the case of using only light receiving elements different in the sensitivity and in the case of providing additional capacitance for a light receiving element, the combining ratio at the time of HDR rendering is determined by the pixel structure and therefore the flexibility is low.

Furthermore, in the case of using light receiving elements different in the sensitivity, when the exposure time becomes long, a motion blur occurs and the resolution of a moving subject decreases in some cases.

Moreover, in the case of controlling the exposure time to extend the dynamic range, for example when a pulse emission light source such as an LED (Light Emitting Diode) road sign is a subject, a flicker phenomenon occurs and it becomes impossible to obtain an image with sufficient quality.

The present technique is made in view of such circumstances and is a technique to enable sufficient extension of the dynamic range and obtention of an image with higher quality.

Solution to Problems

A solid-state imaging element of a first aspect of the present technique includes a pixel array unit in which a plurality of unit pixels are disposed and a drive unit that controls operation of the unit pixel. The unit pixel has a plurality of photoelectric converters. To one or a plurality of the photoelectric converters among the plurality of photoelectric converters, for each of the photoelectric converters, a transfer gate that transfers a charge obtained by photoelectric conversion in the photoelectric converter, a charge accumulating part that accumulates a charge transferred from the photoelectric converter via the transfer gate, and an anti-blooming gate part that resets the photoelectric converter are connected.

The drive unit can be caused to carry out burst driving in which exposure operation of carrying out exposure of the photoelectric converter after resetting the photoelectric converter and transfer operation of transferring a charge obtained by the exposure to the charge accumulating part are repeated a plurality of times in a one-frame period regarding the one or plurality of the photoelectric converters.

The drive unit can be caused to carry out the burst driving while changing an exposure time in the exposure operation.

The drive unit can be caused to control exposure of the photoelectric converter that does not carry out the burst driving in such a manner that a centroid position of the plurality of times of the exposure by the burst driving substantially corresponds with a centroid position of the exposure of the photoelectric converter that does not carry out the burst driving.

The drive unit can be caused to control exposure of the photoelectric converter in such a manner that the exposure of the photoelectric converter synchronizes with light emission of a predetermined pulse light source.

The drive unit can be caused to control ranging by a time-of-flight measurement method by controlling exposure of the photoelectric converter based on a light emission timing of a predetermined pulse light source.

The drive unit can be caused to control exposure of the photoelectric converter in such a manner that a target object that exists at a shorter distance is detected by the photoelectric converter with lower sensitivity and a target object that exists at a longer distance is detected by the photoelectric converter with higher sensitivity.

A driving method of the first aspect of the present technique is a driving method of a solid-state imaging element including a pixel array unit in which a plurality of unit pixels are disposed and a drive unit that controls operation of the unit pixel. The unit pixel has a plurality of photoelectric converters. To one or a plurality of the photoelectric converters among the plurality of photoelectric converters, for each of the photoelectric converters, a transfer gate that transfers a charge obtained by photoelectric conversion in the photoelectric converter, a charge accumulating part that accumulates a charge transferred from the photoelectric converter via the transfer gate, and an anti-blooming gate part that resets the photoelectric converter are connected. The driving method includes a step in which the drive unit carries out burst driving in which exposure operation of carrying out exposure of the photoelectric converter after resetting the photoelectric converter and transfer operation of transferring a charge obtained by the exposure to the charge accumulating part are repeated a plurality of times in a one-frame period regarding the one or plurality of the photoelectric converters.

In the first aspect of the present technique, the solid-state imaging element is provided with the pixel array unit in which the plurality of unit pixels are disposed and the drive unit that controls operation of the unit pixel. The unit pixel has the plurality of photoelectric converters. To one or a plurality of the photoelectric converters among the plurality of photoelectric converters, for each of the photoelectric converters, the transfer gate that transfers a charge obtained by photoelectric conversion in the photoelectric converter, the charge accumulating part that accumulates a charge transferred from the photoelectric converter via the transfer gate, and the anti-blooming gate part that resets the photoelectric converter are connected.

Electronic equipment of a second aspect of the present technique can have a configuration similarly to that of the solid-state imaging element of the first aspect of the present technique.

Advantageous Effect of Invention

According to the first aspect and the second aspect of the present technique, the dynamic range can be sufficiently extended and an image with higher quality can be obtained.

DESCRIPTION OF EMBODIMENTS

Embodiments to which the present technique is applied will be described below with reference to the drawings.

First Embodiment

<Configuration Example of Solid-State Imaging Element>

The present technique is a technique by which, in the case of carrying out HDR rendering by using plural photoelectric converters, sufficient extension of the dynamic range and obtention of an image with higher quality are enabled by, regarding one or plural photoelectric converters, providing the photoelectric converter with a charge accumulating part with the intermediary of a transfer gate and providing the photoelectric converter with a reset gate (anti-blooming gate) and carrying out burst driving. The present technique can be applied to an in-vehicle camera and so forth for example.

Figure 1:
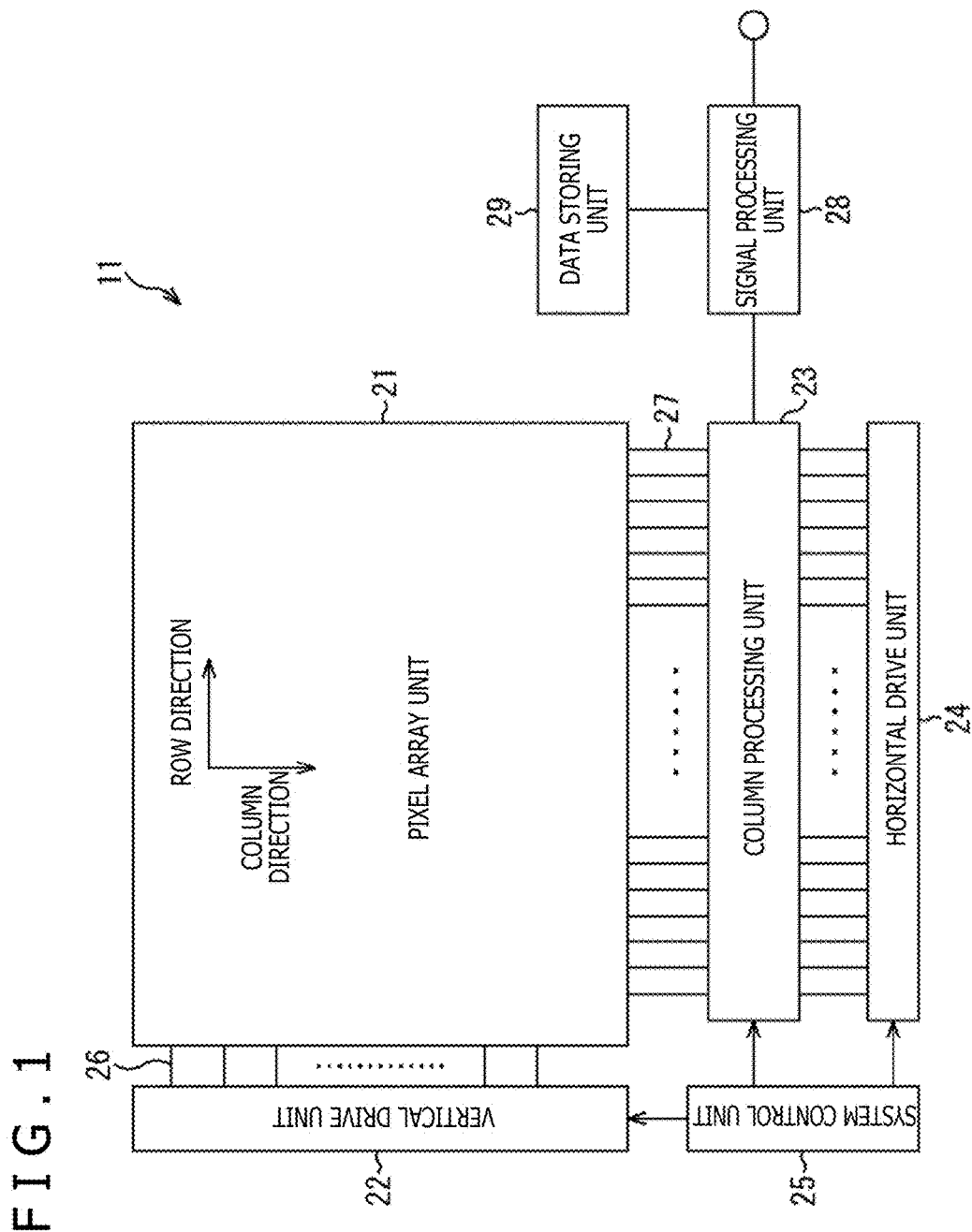
FIG. 1 is a diagram depicting a configuration example of a solid-state imaging element.

FIG. 1 is a diagram depicting a configuration example of a solid-state imaging element to which the present technique is applied.

A solid-state imaging element 11 depicted in FIG. 1 is formed of a CMOS (Complementary Metal Oxide Semiconductor) image sensor or the like for example.

The solid-state imaging element 11 has a configuration having a pixel array unit 21 formed on a semiconductor substrate (chip), which is not diagrammatically represented, and a peripheral circuit part integrated on the same semiconductor substrate as the pixel array unit 21. The peripheral circuit part is composed of a vertical drive unit 22, a column processing unit 23, a horizontal drive unit 24, and a system control unit 25 for example.

The solid-state imaging element 11 further includes a signal processing unit 28 and a data storing unit 29. The signal processing unit 28 and the data storing unit 29 may be mounted on the same substrate as the solid-state imaging element 11 or may be disposed on a substrate different from that of the solid-state imaging element 11.

Furthermore, each processing of the signal processing unit 28 and the data storing unit 29 may be processing by an external signal processing unit, e.g. a DSP (Digital Signal Processor) circuit, provided on a substrate different from that of the solid-state imaging element 11 or software.

The pixel array unit 21 has a configuration in which unit pixels (hereinafter, referred to simply as pixels in some cases) having photoelectric converters that generate and accumulate a charge according to the amount of received light are two-dimensionally disposed in the row direction and the column direction, i.e. in a matrix manner.

Here, the row direction refers to the arrangement direction of pixels on the pixel row (i.e. horizontal direction) and the column direction refers to the arrangement direction of pixels on the pixel column (i.e. vertical direction). That is, the row direction is the lateral direction in the diagram and the column direction is the longitudinal direction in the diagram.

In the pixel array unit 21, for the pixel arrangement in the matrix manner, pixel drive lines 26 are disposed along the row direction for each pixel row and one or two vertical signal lines 27 are disposed along the column line for each pixel column. The pixel drive lines 26 transmit a drive signal for carrying out driving when signals are read out from pixels. It is to be noted that, although the pixel drive line 26 is represented as one interconnect in FIG. 1, it is not limited to one interconnect. One end of the pixel drive line 26 is connected to an output terminal of the vertical drive unit 22 corresponding to a respective one of the rows.

The vertical drive unit 22 is composed of a shift register, an address decoder, and so forth and drives each pixel of the pixel array unit 21 simultaneously for all pixels or in units of row or the like. That is, the vertical drive unit 22 forms a drive unit that controls operation of each pixel of the pixel array unit 21 together with the system control unit 25 that controls the vertical drive unit 22. Although diagrammatic representation is omitted regarding the concrete configuration of this vertical drive unit 22, generally the vertical drive unit 22 has a configuration having two scanning systems, a readout scanning system and a sweep-out scanning system.

A signal output from each unit pixel of a pixel row selected and scanned by the vertical drive unit 22 is input to the column processing unit 23 through the vertical signal line 27 on each pixel column basis. The column processing unit 23 executes predetermined signal processing for the signals output from the respective pixels of the selected row through the vertical signal lines 27 for each pixel column of the pixel array unit 21 and temporarily holds pixel signals after the signal processing.

Specifically, the column processing unit 23 executes noise removal processing, sampling processing such as DDS (Double Data Sampling) and CDS (Correlated Double Sampling), and AD (Analog Digital) conversion processing as the signal processing.

The horizontal drive unit 24 is composed of a shift register, an address decoder, and so forth and sequentially selects unit circuits corresponding to the pixel columns of the column processing unit 23. By the selective scanning by this horizontal drive unit 24, the pixel signals subjected to the signal processing in the column processing unit 23 on each unit circuit basis are sequentially output.

The system control unit 25 is composed of a timing generator that generates various kinds of timing signals and so forth and carries out driving control of the vertical drive unit 22, the column processing unit 23, the horizontal drive unit 24, and so forth based on various kinds of timing generated by the timing generator.

The signal processing unit 28 has at least an arithmetic processing function and executes various kinds of signal processing such as arithmetic processing for the pixel signals output from the column processing unit 23. In the signal processing in the signal processing unit 28, the data storing unit 29 temporarily stores data necessary for the processing.

<Configuration Example of Pixel>

Figure 2:
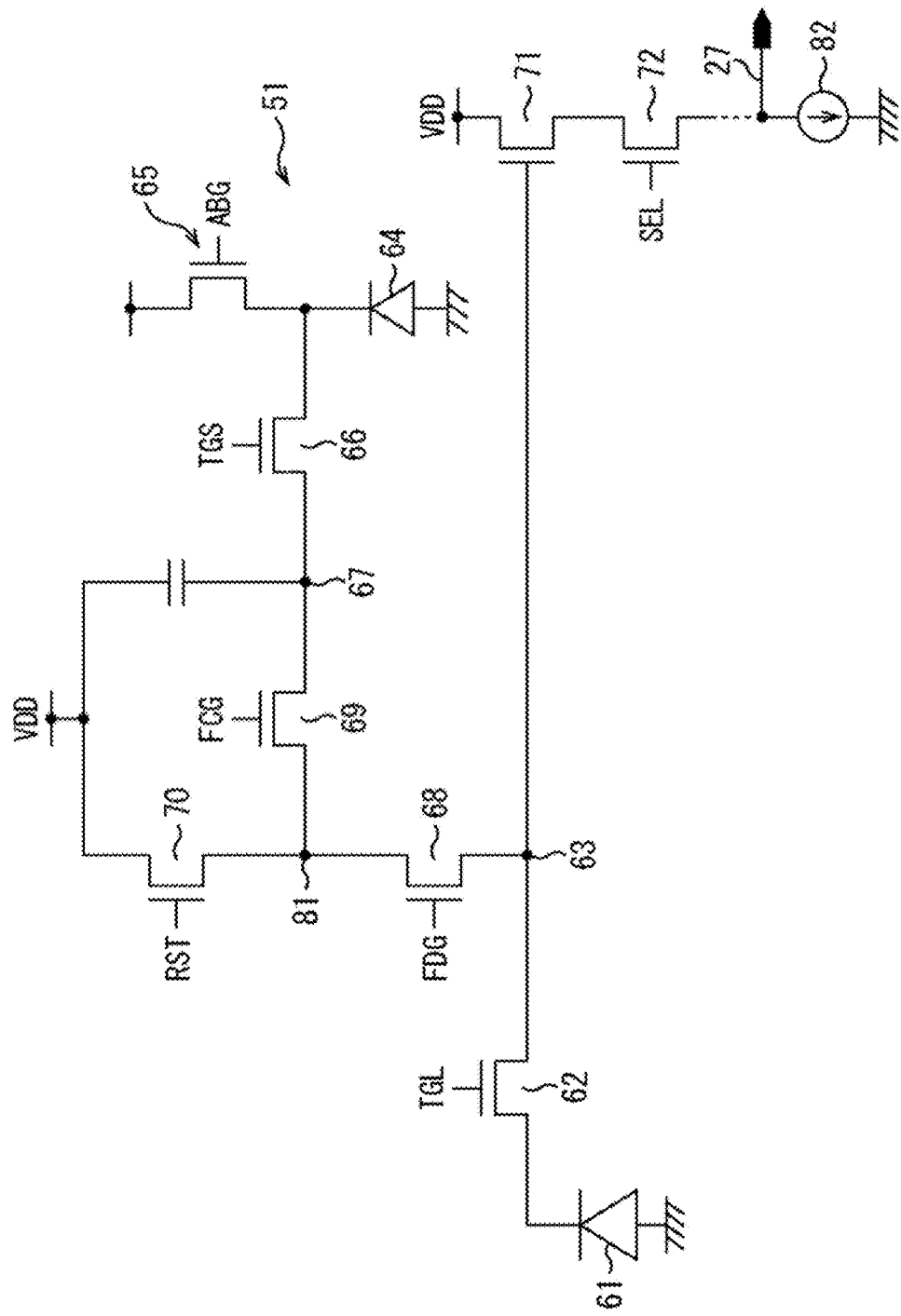
FIG. 2 is a diagram depicting a configuration example of a pixel.

Next, the configuration of the unit pixel provided in the pixel array unit 21 will be described. The unit pixel provided in the pixel array unit 21 is configured as depicted in FIG. 2 for example. It is to be noted that, in FIG. 2, a part corresponding to the case in FIG. 1 is given the same symbol and description thereof is omitted as appropriate.

A pixel 51 that is the unit pixel includes a first photoelectric converter 61, a first transfer gate part 62, an FD part 63, a second photoelectric converter 64, an anti-blooming gate part 65, a second transfer gate part 66, a charge accumulating part 67, a third transfer gate part 68, a fourth transfer gate part 69, a reset gate part 70, an amplification transistor 71, and a selection transistor 72.

Furthermore, for the pixel 51, e.g. plural drive lines are disposed as the pixel drive line 26 for each pixel row. Moreover, from the vertical drive unit 22 through the plural drive lines, each of a drive signal TGL, a drive signal ABG, a drive signal TGS, a drive signal FDG, a drive signal FCG, a drive signal RST, and a drive signal SEL is supplied to a respective one of the first transfer gate part 62, the anti-blooming gate part 65, the second transfer gate part 66, the third transfer gate part 68, the fourth transfer gate part 69, the reset gate part 70, and the selection transistor 72.

These drive signals are pulse signals about which the state of a high level (for example, supply voltage VDD) is the active state and the state of a low level (for example, negative potential) is the inactive state. That is, when the respective drive signals from the drive signal TGL to the drive signal SEL are set to the high level, the transistors of the supply destinations thereof become the conductive state, i.e. the on-state. When the respective drive signals are set to the low level, the transistors of the supply destinations thereof become the non-conductive state, i.e. the off-state.

The first photoelectric converter 61 is formed of a photodiode with a PN junction for example. The first photoelectric converter 61 receives incident light and carries out photoelectric conversion to accumulate a charge obtained as the result.

The first transfer gate part 62 is provided between the first photoelectric converter 61 and the FD part 63 and the drive signal TGL is supplied to the gate electrode of the first transfer gate part 62. If the drive signal TGL becomes the high level, the first transfer gate part 62 is turned on and the charge accumulated in the first photoelectric converter 61 is transferred to the FD part 63 via the first transfer gate part 62.

The FD part 63 is a floating diffusion region called floating diffusion and accumulates the transferred charge.

Similarly to the first photoelectric converter 61, the second photoelectric converter 64 is formed of a photodiode with a PN junction for example, and receives incident light and carries out photoelectric conversion to accumulate a charge obtained as the result.

When the first photoelectric converter 61 and the second photoelectric converter 64 are compared, the area of the light receiving surface is larger and the sensitivity is higher in the first photoelectric converter 61 and the area of the light receiving surface is smaller and the sensitivity is lower in the second photoelectric converter 64.

The anti-blooming gate part 65 is connected between the second photoelectric converter 64 and the power supply VDD. When the drive signal ABG supplied to the gate electrode of the anti-blooming gate part 65 is set to the high level, the anti-blooming gate part 65 is turned on and the charge accumulated in the second photoelectric converter 64 is discharged via the anti-blooming gate part 65. That is, the potential of the second photoelectric converter 64 is reset to the level of the voltage of the power supply (hereinafter, referred to also as the supply voltage VDD).

The second transfer gate part 66 is connected between the second photoelectric converter 64 and the charge accumulating part 67 and the drive signal TGS is supplied to the gate electrode of the second transfer gate part 66. When the drive signal TGS is set to the high level, the second transfer gate part 66 is turned on and the charge accumulated in the second photoelectric converter 64 is transferred to the charge accumulating part 67 via the second transfer gate part 66.

Furthermore, the potential is slightly deep under the gate electrode of the second transfer gate part 66 and an overflow path to transfer, to the charge accumulating part 67, a charge that exceeds the saturation charge amount of the second photoelectric converter 64 and spills from the second photoelectric converter 64 is formed.

The charge accumulating part 67 is formed of a capacitor for example and is connected between the fourth transfer gate part 69 and the second transfer gate part 66. Furthermore, the counter electrode of the charge accumulating part 67 is connected to the power supply VDD that supplies the supply voltage VDD. The charge accumulating part 67 accumulates the charge transferred from the second photoelectric converter 64.

It is to be noted that, although the example in which the charge accumulating part 67 is connected to the power supply VDD is described here, the charge accumulating part 67 may be connected to not the power supply VDD but a ground GND because being a capacitor.

The third transfer gate part 68 is connected among the fourth transfer gate part 69, the reset gate part 70, and the FD part 63 and the drive signal FDG is supplied to the gate electrode of the third transfer gate part 68. When the drive signal FDG is set to the high level, the third transfer gate part 68 is turned on and a node 81 among the fourth transfer gate part 69, the reset gate part 70, and the third transfer gate part 68 and the FD part 63 are electrically connected. That is, the potentials of the node 81 and the FD part 63 are coupled.

The fourth transfer gate part 69 is connected between the charge accumulating part 67 and the node 81 and the drive signal FCG is supplied to the gate electrode of the fourth transfer gate part 69. When the drive signal FCG is set to the high level, the fourth transfer gate part 69 is turned on and the charge accumulating part 67 and the node 81 are electrically connected. That is, the potentials of the charge accumulating part 67 and the node 81 are coupled.

The reset gate part 70 is connected between the power supply VDD and the node 81 and the drive signal RST is supplied to the gate electrode of the reset gate part 70. When the drive signal RST is set to the high level, the reset gate part 70 is turned on and the potential of the node 81 is reset to the level of the supply voltage VDD.

In the amplification transistor 71, the gate electrode is connected to the FD part 63 and the drain is connected to the power supply VDD. The amplification transistor 71 serves as an input part of a readout circuit that reads out a signal corresponding to the charge held by the FD part 63, a so-called source follower circuit. Specifically, in the amplification transistor 71, the source is connected to the vertical signal line 27 with the intermediary of the selection transistor 72. Due to this, the amplification transistor 71 forms the source follower circuit with a constant current source 82 connected to one end of the vertical signal line 27.

The selection transistor 72 is connected between the source of the amplification transistor 71 and the vertical signal line 27 and the drive signal SEL is supplied to the gate electrode of the selection transistor 72. When the drive signal SEL is set to the high level, the selection transistor 72 is turned on and the pixel 51 becomes the selected state. Due to this, a pixel signal output from the amplification transistor 71 is output to the vertical signal line 27 via the selection transistor 72.

It is to be noted that, hereinafter, that the respective drive signals become the active state, i.e. the high level, will be referred to also as that the respective drive signals are turned on, and that the respective drive signals become the inactive state, i.e. the low level, will be referred to also as that the respective drive signals are turned off.

<About Burst Driving of Second Photoelectric Converter>

Incidentally, in the solid-state imaging element 11, exposure is carried out in the first photoelectric converter 61 and the second photoelectric converter 64 and pixel signals obtained by the exposure of these respective photoelectric converters are subjected to HDR rendering to be turned to pixel signals of the pixels of the final photographed image.

In the solid-state imaging element 11, the charge accumulating part 67 is connected to the second photoelectric converter 64 provided in each pixel 51 of the pixel array unit 21 with the intermediary of the second transfer gate part 66. Furthermore, the anti-blooming gate part 65 is connected to the second photoelectric converter 64.

Thus, in the solid-state imaging element 11, burst driving of the second photoelectric converter 64 is enabled by driving control by the vertical drive unit 22. Specifically, in the period of one frame, exposure operation of carrying out exposure of the second photoelectric converter 64 after resetting the second photoelectric converter 64 and subsequent transfer operation of transferring a charge obtained by the exposure to the charge accumulating part 67 and accumulating the charge can be repeatedly carried out at arbitrary timings an arbitrary number of times. Here, the one-frame period is the period during which photographed images of one frame are acquired when the solid-state imaging element 11 carries out photographing of the photographed images.

By doing so, the total time of the exposure in the second photoelectric converter 64 in the one-frame period can be arbitrarily changed. This can sufficiently ensure the sensitivity ratio between the first photoelectric converter 61 and the second photoelectric converter 64 and sufficiently extend the dynamic range of the photographed image. In addition, by such burst driving, the sensitivity ratio between the first photoelectric converter 61 and the second photoelectric converter 64, i.e. the combining ratio of pixel signals, can be arbitrarily changed and thus the flexibility at the time of HDR rendering can be improved.

Furthermore, blurring of the subject can be suppressed by arbitrarily changing the total time of exposure in the second photoelectric converter 64 in the one-frame period and increasing the ratio of the exposure time in a predetermined period to the total exposure time in the second photoelectric converter 64 in the one-frame period. As a result, the occurrence of a motion blur can be suppressed.

Moreover, a pulse light source can be captured by synchronizing the exposure timing in the second photoelectric converter 64 in the one-frame period with the light emission timing of the pulse light source and carrying out exposure plural times in a divided manner in the one-frame period while shifting the exposure timing in the second photoelectric converter 64. As a result, the occurrence of a flicker can be suppressed.

By the burst driving of the second photoelectric converter 64 in this manner, the occurrence of motion blur and flicker can be suppressed and photographed images with higher quality can be obtained.

Next, the burst driving of the second photoelectric converter 64 will be described more specifically.

In the following, as an example, description will be made about the case in which the solid-state imaging element 11 is mounted in an in-vehicle camera that photographs the front side of a vehicle and detects white lines, road signals, LED road signs, oncoming vehicles, and so forth from obtained photographed images for example. In particular, as an example of capturing of a pulse light source, a road signal that employs an LED as the light source will be described.

In recent years, road signals that employ an LED as the light source have been increasing and pulse light emission based on full-wave rectification of a commercial AC power supply is general as driving thereof. For example, as depicted in FIG. 3, the driving is AC driving at 60*2=120 Hz in western Japan and is AC driving at 50*2=100 Hz in eastern Japan.

Figure 3:
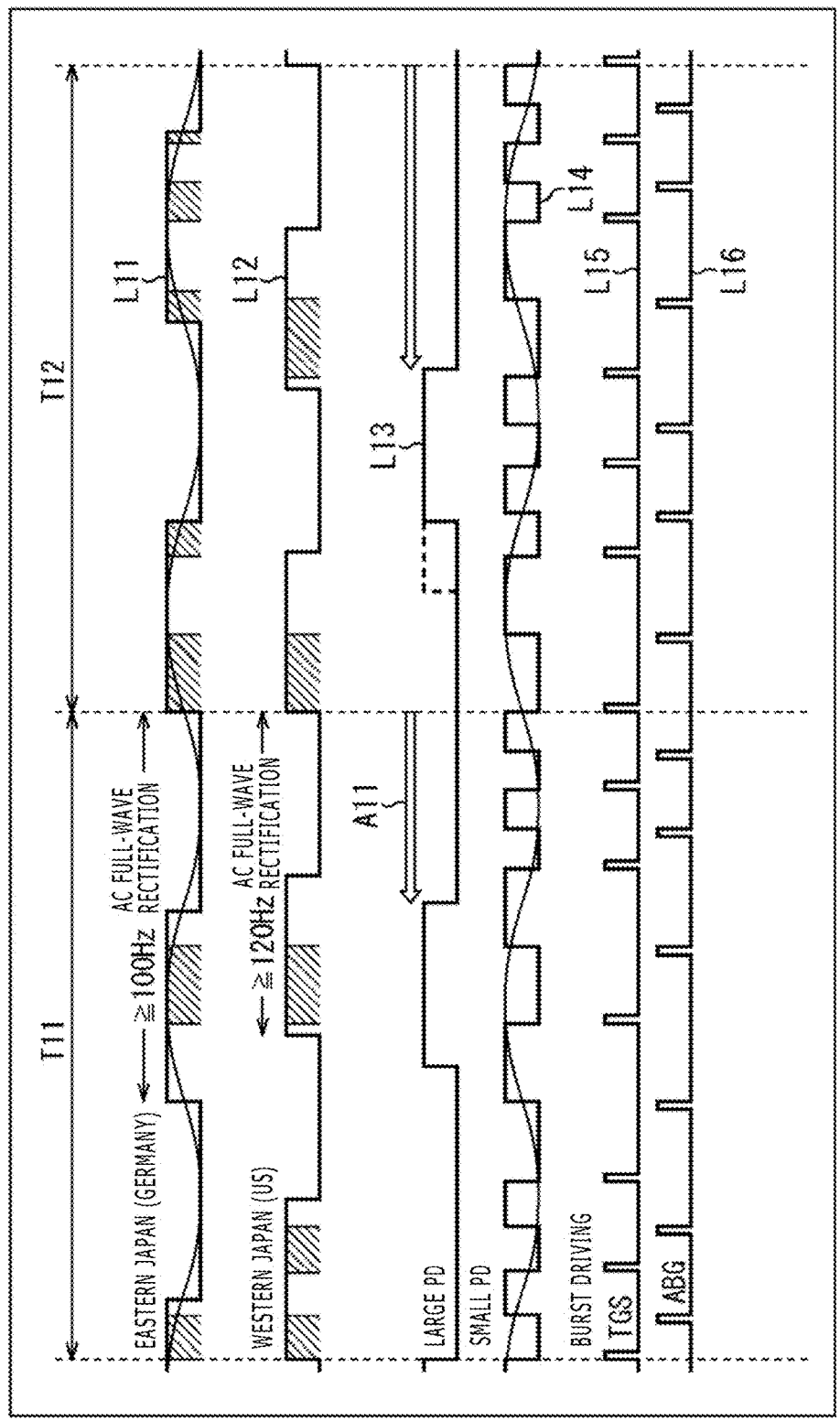
FIG. 3 is a diagram for explaining exposure control of the pixel.

It is to be noted that, in FIG. 3, the abscissa axis indicates the time. Furthermore, a period T11 and a period T12 represent the period of one frame of the photographed image photographed by the solid-state imaging element 11. In this example, the frame rate of the photographed image is 60 Hz and therefore the period T11 and the period T12 are sections of 1/60 seconds.

Moreover, in FIG. 3, a polygonal line L11 and a polygonal line L12 represent the light emission timing of the road signal in eastern Japan and the light emission timing of the road signal in western Japan. In particular, the periods during which a respective one of the polygonal line L11 and the polygonal line L12 is upwardly projection represent periods during which the road signal emits light.

Furthermore, a polygonal line L13 and a polygonal line L14 represent the exposure timing of the first photoelectric converter 61 and the exposure timing in the second photoelectric converter 64. In particular, the periods during which a respective one of the polygonal line L13 and the polygonal line L14 is upwardly projection represent exposure periods.

Moreover, a polygonal line L15 and a polygonal line L16 represent the drive signal TGS and the drive signal ABG. Here, the state in which a respective one of the drive signals is upwardly projection represents the on-state of the drive signal, i.e. the active state.

In FIG. 3, as illustrated by the polygonal line L11 and the polygonal line L12, the road signal with the LED light source is subjected to AC driving at 120 Hz in western Japan and is subjected to AC driving at 100 Hz in eastern Japan.

In this case, in a general 60-fps camera, one time of high-speed shutter exposure is carried out in the one-frame period. For this reason, when the exposure timing of the camera corresponds with the timing of no light emission of the road signal, light emission (lighting) of the road signal is not photographed by the camera, i.e. the state in which light emission of the road signal does not appear in the photographed image occurs.

In contrast, in the solid-state imaging element 11, the occurrence of a flicker due to LED pulse light emission of the road signal can be suppressed by carrying out the burst driving of the second photoelectric converter 64 and carrying out light reception (exposure) with a frequency and a phase different from the frame reading cycle of the photographed image.

It is to be noted that, because the road signal, which is a light emission source subject, has high luminance, a necessary and sufficient effect can be obtained merely by carrying out the burst driving of only the second photoelectric converter 64, whose sensitivity is lower.

Specifically, in the example depicted in FIG. 3, exposure of the second photoelectric converter 64 is started at the timing when the drive signal ABG is switched from the on-state to the off-state and a reset of the second photoelectric converter 64 is released. Then, the exposure period ends at the timing when the drive signal TGS is turned on and a charge accumulated in the second photoelectric converter 64 due to the exposure is transferred to the charge accumulating part 67.

For example, in the period T11, which is the period of one frame, exposure and non-exposure of the second photoelectric converter 64 are alternately repeated and the total length of the exposure period in the one-frame period (hereinafter, referred to as the total exposure time) and the total length of the non-exposure period (hereinafter, referred to as the total non-exposure time) are the same length. In this example, the HDR rendering ratio (sensitivity ratio) is enlarged by a factor of 2 by setting the total exposure time of the second photoelectric converter 64 in the one-frame period to the time that is half the one-frame period.

Furthermore, in this example, the lengths of a non-exposure period of the second photoelectric converter 64 and the exposure period subsequent to the non-exposure period are equal. Moreover, the lengths of the respective exposure periods of the second photoelectric converter 64 are different lengths. That is, the vertical drive unit 22 implements non-linear burst driving of the second photoelectric converter 64 by driving the pixel 51 while changing the exposure time of the second photoelectric converter 64 as appropriate.

In particular, here the burst driving of the second photoelectric converter 64 synchronizes with the pulse light emission timing of the road signal in eastern Japan, i.e. the pulse emission light source of 100 Hz, and exposure of the second photoelectric converter 64 is carried out in matching with the light emission timing of the road signal in eastern Japan.

Thus, at each light emission timing of the road signal in eastern Japan, a time that is approximately half the light emission time of the road signal overlaps with the exposure period of the second photoelectric converter 64 and the exposure time at each light emission timing of the road signal is sufficiently ensured. Similarly, also at each light emission timing of the road signal in western Japan, a time that is approximately half the light emission time of the road signal overlaps with the exposure period of the second photoelectric converter 64.

It is to be noted that, in the polygonal line L11 and the polygonal line L12, hatched parts represent periods that are not the exposure period of the second photoelectric converter 64 and parts that are not hatched represent periods that overlap with the exposure period of the second photoelectric converter 64.

As is understood from the polygonal line L11 and the polygonal line L12, due to the non-linear burst driving of the second photoelectric converter 64, a sufficient amount of light emitted by the road signal in each light emission period of the road signal can be received by the second photoelectric converter 64. Due to this, light from the pulse emission light source such as a road signal can be captured more surely and the occurrence of a flicker can be suppressed.

Furthermore, the centroid position of exposure of the second photoelectric converter 64 in the one-frame period can be adjusted to an arbitrary phase (clock time) through control of the length and phase (clock time) of each exposure period by the non-linear burst driving of the second photoelectric converter 64. In this example, it turns out that, in the period T11 for example, the peak part of a sine wave drawn with the polygonal line L14 is at the centroid position of exposure of the second photoelectric converter 64 and the centroid position of exposure of the second photoelectric converter 64 is a position in a light emission period of the road signal in eastern Japan.

For this reason, the exposure of the second photoelectric converter 64 is high-speed shutter exposure that synchronizes with the light emission timing of the road signal in eastern Japan. Furthermore, the exposure time of the second photoelectric converter 64 in the one-frame period is the time that is half the one-frame period.

Therefore, even if the road signal that is a subject is moving from the viewpoint of the solid-state imaging element 11, i.e. even if the road signal becomes a moving subject, the road signal does not blur in photographed images composed of pixel signals obtained by exposure of the second photoelectric converter 64. By such burst driving of the second photoelectric converter 64, the occurrence of motion blur and flicker can be suppressed.

It is to be noted that, if the second photoelectric converter 64 is subjected to the burst driving non-linearly, the length of the period composed of a non-exposure period and an exposure period subsequent to the non-exposure period may be set to randomly change or may be changed according to the light emission timing of a desired pulse emission light source. In particular, if exposure in the second photoelectric converter 64 is controlled to be synchronized with the light emission timing of a pulse emission light source, the exposure can be carried out more efficiently.

Furthermore, the total exposure time of the second photoelectric converter 64 and the timings at which the respective exposures are carried out in the one-frame period can be set regarding each frame.

Moreover, if the total exposure time of the second photoelectric converter 64 in the one-frame period is set to a desired length by the burst driving of the second photoelectric converter 64, the sensitivity ratio between the first photoelectric converter 61 and the second photoelectric converter 64 can be arbitrarily set. This allows not only sufficient extension of the dynamic range of the photographed image but also free setting of the HDR rendering ratio.

Furthermore, in the case of carrying out exposure also in the first photoelectric converter 61 simultaneously with exposure of the second photoelectric converter 64, a rendering artifact occurs if the deviation between the centroid position of the exposure periods of the second photoelectric converter 64 in the one-frame period and the centroid position of the exposure period of the first photoelectric converter 61 is large.

Thus, the vertical drive unit 22 shifts the exposure period of the first photoelectric converter 61 to an arbitrary phase as illustrated by an arrow A11 for example to cause the centroid position of the exposure period of the first photoelectric converter 61 to correspond with the centroid position of the exposure periods of the second photoelectric converter 64. This makes it possible to suppress the occurrence of a rendering artifact and obtain photographed images with higher quality.

Furthermore, in this example, the exposure period of the first photoelectric converter 61 is also a period shorter than the one-frame period and the occurrence of a motion blur can be suppressed. It is to be noted that, regarding the first photoelectric converter 61, the whole period of the one-frame period may be set to the exposure period particularly if the moving subject resolution can be sufficiently ensured, i.e. the motion blur is sufficiently small.

In the solid-state imaging element 11, regarding the second photoelectric converter 64 for example, exposure is carried out in all pixels concurrently. Regarding the first photoelectric converter 61, exposure is carried out for each of pixel rows that are lined up in the column direction in turn.

For example, when shutter control of the first photoelectric converter 61 is carried out, in a system in which light is received immediately before the reading cycle of pixel signals as 1/60 seconds, it is impossible to synchronize the exposure timing of the first photoelectric converter 61 with the exposure timing of the second photoelectric converter 64 and the light emission timing of a pulse emission light source.

Thus, it is effective to enable the reading phase of pixel signals to be changed between an odd-numbered frame and an even-numbered frame of photographed images.

Figure 4:
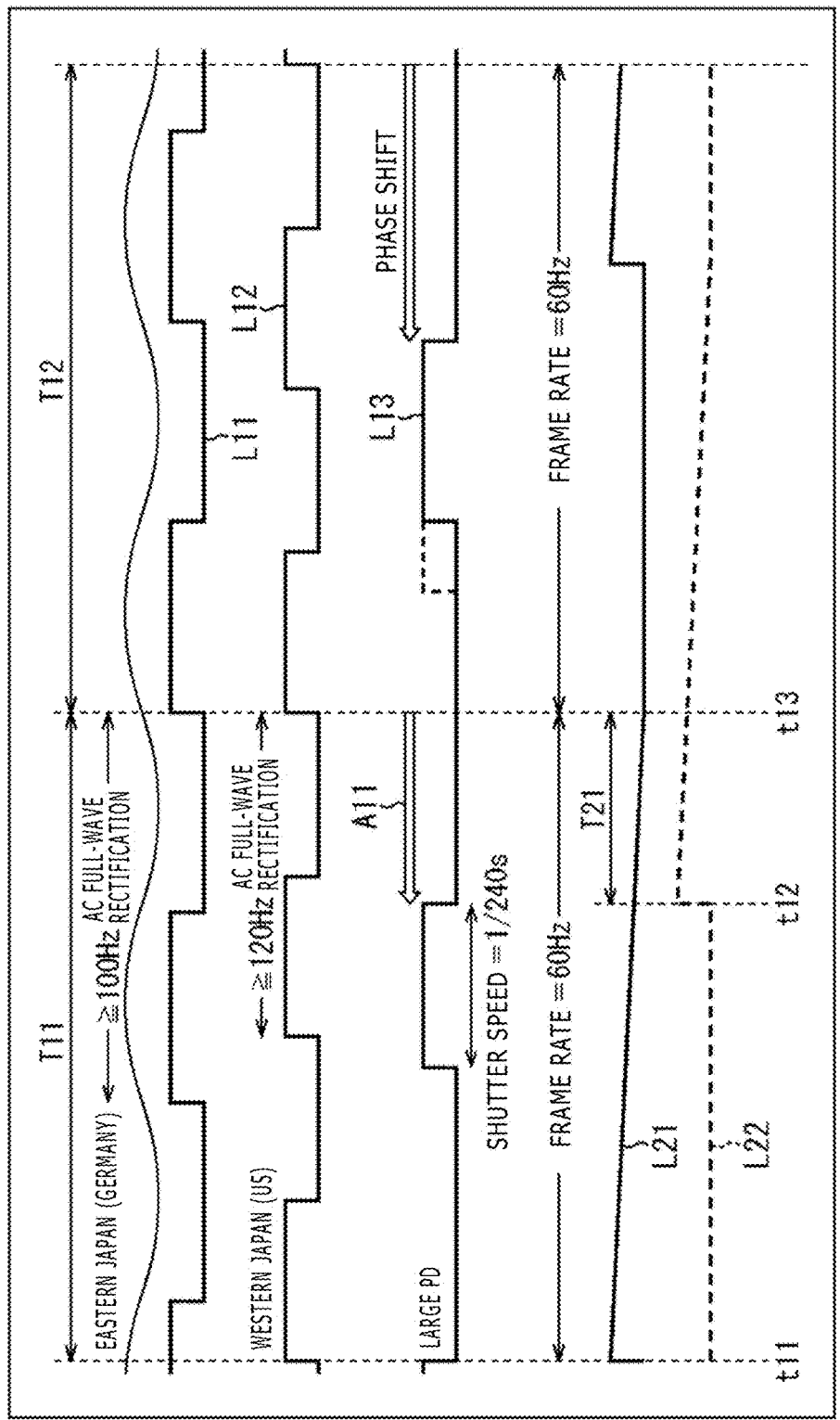
FIG. 4 is a diagram for explaining the exposure control of the pixel.

A consideration will be made about the case in which, as depicted in FIG. 4 for example, the exposure period of the first photoelectric converter 61 is shifted in the time direction by phase shift and exposure of the respective frames of photographed images and reading of pixel signals are carried out. It is to be noted that, in FIG. 4, a part corresponding to the case in FIG. 3 is given the same symbol and description thereof is omitted as appropriate.

In FIG. 4, a polygonal line L21 represents the state of exposure, i.e. accumulation of a charge, and reading of pixel signals in a predetermined odd-numbered frame. It is to be noted that the part in which the polygonal line L21 is inclined in the downward direction in the diagram represents the state in which the pixel row from which the pixel signals are read out is shifted in the column direction.

Similarly, a polygonal line L22 represents the state of exposure and reading of pixel signals in an even-numbered frame subsequent to the odd-numbered frame depicted by the polygonal line L21. It is to be noted that the part in which the polygonal line L22 is inclined in the downward direction in the diagram represents the state in which the pixel row from which the pixel signals are read out is shifted in the column direction.

In this example, the reading of the pixel signals in the odd-numbered frame depicted by the polygonal line L21 is started at a clock time t11, so that the pixel rows of the pixel array unit 21 are selected in turn in the column direction and the pixel signals are read out from the pixels that form these selected pixel rows. Then, the reading of the pixel signals from all pixels of the odd-numbered frame is completed at a clock time t13 that is the clock time of the end of the one-frame period.

In contrast, in the even-numbered frame depicted by the polygonal line L22, the period from the clock time t11 to a clock time t12 is a period in which exposure is carried out. In this period, exposure of the first photoelectric converter 61 and the second photoelectric converter 64 is carried out at predetermined clock times.

Then, when the exposure of the even-numbered frame ends at the clock time t12, thereafter the reading of the pixel signals in the even-numbered frame depicted by the polygonal line L22 is started, so that the pixel rows of the pixel array unit 21 are selected in turn in the column direction and the pixel signals are read out from the pixels that form these selected pixel rows.

However, in the case of carrying out such driving, in a period T21 from the clock time t12 to the clock time t13, not only the reading of the pixel signals of the odd-numbered frame depicted by the polygonal line L21 but also the reading of the pixel signals of the even-numbered frame depicted by the polygonal line L22 is carried out. That is, the signal output periods during which the pixel signals are read out overlap between the odd-numbered frame and the even-numbered frame that are consecutive in the time direction.

For this reason, for example if the pixels that are provided in the pixel array unit 21 and are lined up in the column direction are connected to the same vertical signal line 27, the reading of the pixel signals from the pixels in the even-numbered frame is started before completion of the reading of the pixel signals from the pixels in the odd-numbered frame. Therefore, some kind of contrivance is necessary to allow the pixel signals to be correctly read out even when the signal output periods of frames that are temporally consecutive overlap.

Thus, for example if a DOL (Double Output Line) structure is employed for the path from a position subsequent to the amplification transistor 71 and the selection transistor 72 of the pixel 51 to the AD converter of the column processing unit 23, it becomes possible to read out pixel signals from the respective pixels even when the signal output periods overlap.

Specifically, two vertical signal lines 27 are provided for the pixel column arranged in the column direction in the pixel array unit 21 and each pixel 51 that forms the pixel column is connected to either vertical signal line 27 of the two vertical signal lines 27. Furthermore, in the column processing unit 23, each of AD converters that execute AD conversion processing is provided for a respective one of the two vertical signal lines 27.

Due to this, for example if pixel signals from the pixels 51 are read out by using one vertical signal line 27 regarding the odd-numbered frame and pixel signals from the pixels 51 are read out by using the other vertical signal line 27 regarding the even-numbered frame, the driving described with reference to FIG. 3 can be implemented.

As above, regarding the first photoelectric converter 61, to which the anti-blooming gate part is not connected, the phase of the exposure period of the first photoelectric converter 61 can be shifted (moved) on each frame basis by providing a DOL output circuit. As a result, the centroid position, in the time direction, of the exposure periods of the second photoelectric converter 64 for which burst driving is carried out can be caused to substantially correspond with the centroid position of the exposure period of the first photoelectric converter 61 in the time direction.

Furthermore, an external memory for delay may be provided so that synchronous signal processing of the first photoelectric converter 61 and the second photoelectric converter 64 can be executed even when the signal output periods overlap, and pixel signals may be temporarily held in the external memory.

Besides, a configuration that can operate at twice the normal speed may be employed as the configuration to read out pixel signals. Specifically, if AD converters of the double speed are provided in the column processing unit 23 and the phase of the exposure period of the first photoelectric converter 61 is allowed to be shifted by up to half of the one-frame period, pixel signals can be read out without the occurrence of overlapping of the signal output periods between the odd-numbered frame and the even-numbered frame.

Moreover, a frame sequential system may be employed if it is impossible to employ the DOL structure for the reading path part of pixel signals.

Specifically, for example in the first frame of photographed images, whole-period exposure of one frame is carried out regarding the first photoelectric converter 61 and the above-described non-linear burst driving is carried out regarding the second photoelectric converter 64. This can suppress the occurrence of a flicker in the photographed image of the first frame.

In contrast, in the second frame, high-speed shutter exposure is carried out in the latter half of the one-frame period, i.e. immediately before reading of pixel signals, regarding the first photoelectric converter 61. Regarding the second photoelectric converter 64, exposure is carried out according to the exposure period in the first photoelectric converter 61. The exposure of the second photoelectric converter 64 may be burst driving or may be not so. This can suppress the occurrence of a rendering artifact and the occurrence of a motion blur in the second frame.

If such driving is alternately carried out, photographed images in which the occurrence of a flicker is suppressed and photographed images in which the occurrence of rendering artifact and motion blur is suppressed can be obtained.

<About Operation of Solid-State Imaging Element>

Next, operation of the solid-state imaging element 11 will be described.

Figure 5:
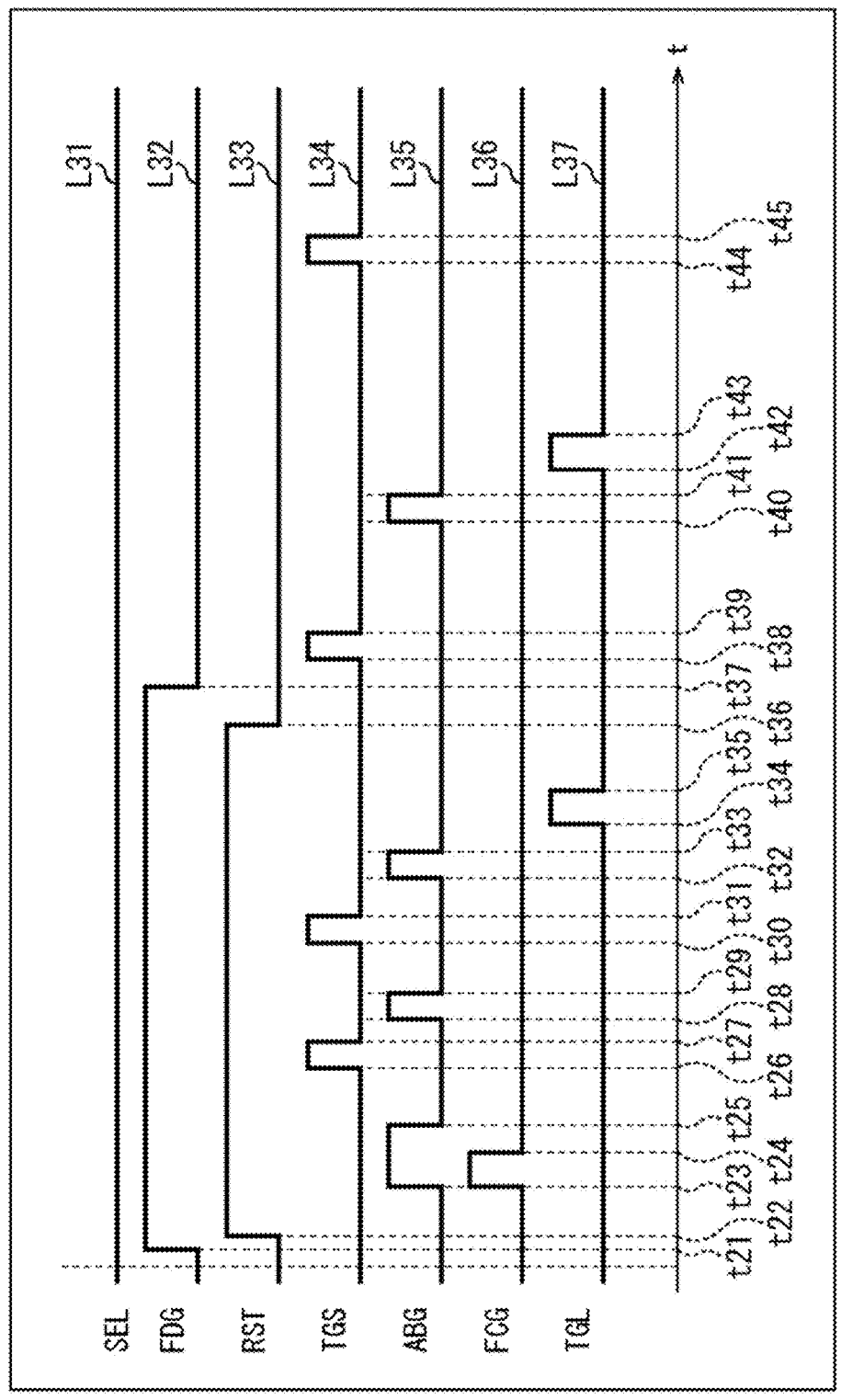
FIG. 5 is a timing chart for explaining driving at the time of exposure.

First, with reference to a timing chart of FIG. 5, exposure operation of the pixel 51 will be described. It is to be noted that, in FIG. 5, a polygonal line L31 to a polygonal line L37 represent the drive signal SEL, the drive signal FDG, the drive signal RST, the drive signal TGS, the drive signal ABG, the drive signal FCG, and the drive signal TGL. Furthermore, regarding each drive signal, the upwardly-projection state in the diagram represents the state in which the drive signal is turned on.

At a clock time t21, the vertical drive unit 22 turns on the drive signal FDG to turn on the third transfer gate part 68 and electrically connect the FD part 63 and the node 81. Then, at a clock time t22, the vertical drive unit 22 turns on the drive signal RST to turn on the reset gate part 70. Thereby, the FD part 63 and the node 81 are reset.

At a clock time t23, the vertical drive unit 22 turns on the drive signal FCG and the drive signal ABG. Thereby, the fourth transfer gate part 69 is turned on and the state in which the charge accumulating part 67, the node 81, and the FD part 63 are electrically connected is obtained, so that these regions are reset. Furthermore, the anti-blooming gate part 65 is turned on and the second photoelectric converter 64 is reset.

At a clock time t24, the vertical drive unit 22 turns off the drive signal FCG to turn off the fourth transfer gate part 69. Thereby, the state in which the charge accumulating part 67 and the node 81 are electrically isolated is obtained and the reset of the charge accumulating part 67 is released.

Subsequently, at a clock time t25, the vertical drive unit 22 turns off the drive signal ABG to turn off the anti-blooming gate part 65 and release the reset of the second photoelectric converter 64. Thereby, exposure in the second photoelectric converter 64 is started. Thereafter, the vertical drive unit 22 carries out non-linear burst driving of the second photoelectric converter 64.

Specifically, at a clock time t26, the vertical drive unit 22 turns on the drive signal TGS to turn on the second transfer gate part 66. Thereby, a charge obtained by photoelectric conversion in the second photoelectric converter 64 is transferred from the second photoelectric converter 64 to the charge accumulating part 67 via the second transfer gate part 66 and is accumulated. Furthermore, at a clock time t27, the vertical drive unit 22 turns off the drive signal TGS and thereby turns off the second transfer gate part 66 to end the transfer of the charge and end the exposure in the second photoelectric converter 64.

At a clock time t28, the vertical drive unit 22 turns on the drive signal ABG to turn on the anti-blooming gate part 65 and reset the second photoelectric converter 64. At a clock time t29, the vertical drive unit 22 turns off the drive signal ABG to turn off the anti-blooming gate part 65 and release the reset of the second photoelectric converter 64. Thereby, exposure of the second photoelectric converter 64 is started again.

At a clock time t30, the vertical drive unit 22 turns on the drive signal TGS to turn on the second transfer gate part 66 and transfer the charge of the second photoelectric converter 64 to the charge accumulating part 67. At a clock time t31, the vertical drive unit 22 turns off the drive signal TGS to turn off the second transfer gate part 66 and end the transfer of the charge.

At a clock time t32, the vertical drive unit 22 turns on the drive signal ABG to turn on the anti-blooming gate part 65 and reset the second photoelectric converter 64. At a clock time t33, the vertical drive unit 22 turns off the drive signal ABG to turn off the anti-blooming gate part 65 and release the reset of the second photoelectric converter 64.

At a clock time t34, the vertical drive unit 22 turns on the drive signal TGL and turns on the first transfer gate part 62 to reset the first photoelectric converter 61. At a clock time t35, the vertical drive unit 22 turns off the drive signal TGL and turns off the first transfer gate part 62 to release the reset of the first photoelectric converter 61. Thereby, exposure in the first photoelectric converter 61 is started.

At a clock time t36, the vertical drive unit 22 turns off the drive signal RST to turn off the reset gate part 70 and release the reset of the FD part 63 and the node 81. Then, at a clock time t37, the vertical drive unit 22 turns off the drive signal FDG to turn off the third transfer gate part 68 and electrically isolate the FD part 63 and the node 81.

At a clock time t38, the vertical drive unit 22 turns on the drive signal TGS to turn on the second transfer gate part 66 and transfer the charge of the second photoelectric converter 64 to the charge accumulating part 67. At a clock time t39, the vertical drive unit 22 turns off the drive signal TGS to turn off the second transfer gate part 66 and end the transfer of the charge.

At a clock time t40, the vertical drive unit 22 turns on the drive signal ABG to turn on the anti-blooming gate part 65 and reset the second photoelectric converter 64. At a clock time t41, the vertical drive unit 22 turns off the drive signal ABG to turn off the anti-blooming gate part 65 and release the reset of the second photoelectric converter 64.

At a clock time t42, the vertical drive unit 22 turns on the drive signal TGL and turns on the first transfer gate part 62. Thereby, a charge obtained by photoelectric conversion in the first photoelectric converter 61 is transferred from the first photoelectric converter 61 to the FD part 63 via the first transfer gate part 62 and is accumulated. Moreover, at a clock time t43, the vertical drive unit 22 turns off the drive signal TGL and turns off the first transfer gate part 62 to end the transfer of the charge from the first photoelectric converter 61. Thereby, the exposure in the first photoelectric converter 61 ends.

The vertical drive unit 22 can suppress the occurrence of rendering artifact and motion blur by causing the temporal centroid position of the exposure period of the first photoelectric converter 61 to substantially correspond with the temporal centroid position of the exposure periods of the second photoelectric converter 64.

Furthermore, at a clock time t44, the vertical drive unit 22 turns on the drive signal TGS to turn on the second transfer gate part 66 and transfer the charge of the second photoelectric converter 64 to the charge accumulating part 67. At a clock time t45, the vertical drive unit 22 turns off the drive signal TGS to turn off the second transfer gate part 66 and end the transfer of the charge. Also from then on, non-linear burst driving of the second photoelectric converter 64 is carried out as appropriate until reading of pixel signals is started.

In the above-described manner, the solid-state imaging element 11 carries out exposure of the first photoelectric converter 61 at an arbitrary phase while carrying out the non-linear burst driving of the second photoelectric converter 64 to carry out exposure in the second photoelectric converter 64. Due to this, the dynamic range of the photographed image can be sufficiently extended. In addition, the occurrence of flicker, motion blur, and rendering artifact can be suppressed and photographed images with higher quality can be obtained.

Subsequently, with reference to a timing chart of FIG. 6, operation at the time of reading of the pixel signal of the pixel 51 will be described. This processing is executed for each of the pixel rows of the pixel array unit 21 in predetermined scan order after the processing of FIG. 5 is executed for example.

Figure 6:
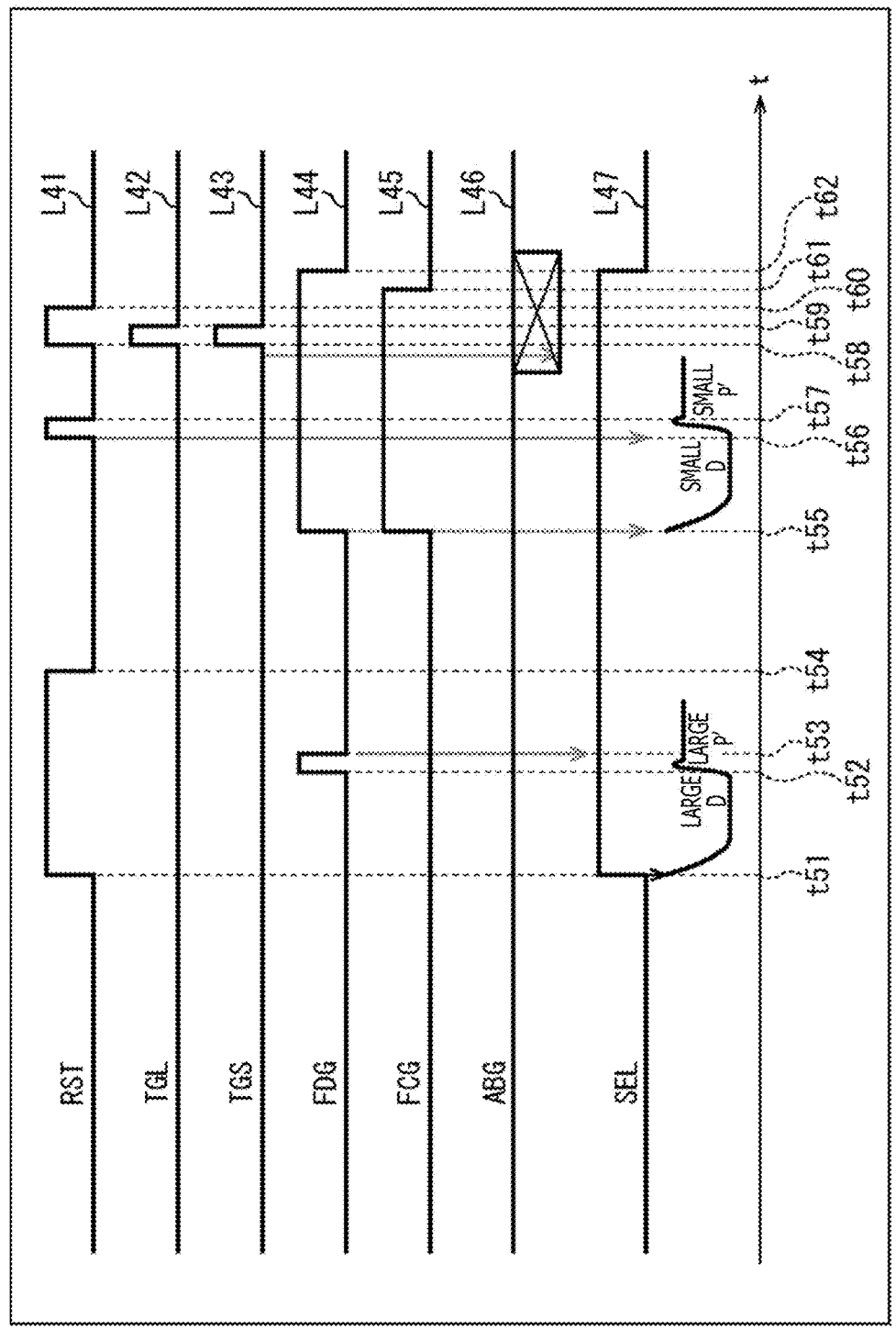
FIG. 6 is a timing chart for explaining driving at the time of reading of a pixel signal.

It is to be noted that, in FIG. 6, a polygonal line L41 to a polygonal line L47 represent the drive signal RST, the drive signal TGL, the drive signal TGS, the drive signal FDG, the drive signal FCG, the drive signal ABG, and the drive signal SEL. Furthermore, regarding each drive signal, the upwardly-projection state in the diagram represents the state in which the drive signal is turned on.

When reading operation of the pixel signal is carried out, the pixel 51 is in the state in which the drive signal ABG has been turned on and the anti-blooming gate part 65 has been turned on, i.e. the state in which the second photoelectric converter 64 has been reset.

At a clock time t51, the vertical drive unit 22 turns on the drive signal RST to turn on the reset gate part 70. Furthermore, at the clock time t51, the vertical drive unit 22 turns on the drive signal SEL to turn on the selection transistor 72 and set the pixel 51 to the selected state.

At this time, the pixel 51 is in the state in which the charge transferred from the first photoelectric converter 61 at the time of exposure operation is accumulated in the FD part 63. Thus, a signal according to the amount of charge accumulated in the FD part 63, i.e. the amount of charge obtained by exposure in the first photoelectric converter 61, is output from the amplification transistor 71 to the column processing unit 23 via the selection transistor 72 and the vertical signal line 27. The column processing unit 23 reads the signal output from the amplification transistor 71 in this manner as the signal level of the pixel signal obtained by the exposure in the first photoelectric converter 61.

At a clock time t52, the vertical drive unit 22 turns on the drive signal FDG to turn on the third transfer gate part 68 and electrically connect the FD part 63 and the node 81. Thereby, the FD part 63 and the node 81 are reset.

At a clock time t53, the vertical drive unit 22 turns off the drive signal FDG to turn off the third transfer gate part 68 and electrically isolate the FD part 63 and the node 81.

In this case, in the state in which the FD part 63 has been reset, a signal according to the amount of charge accumulated in the FD part 63 is output from the amplification transistor 71 to the column processing unit 23 via the selection transistor 72 and the vertical signal line 27. The column processing unit 23 reads the signal output from the amplification transistor 71 in this manner as the reset level of the pixel signal obtained in the first photoelectric converter 61. In the column processing unit 23, the pixel signal obtained by the exposure in the first photoelectric converter 61 is generated from the reset level and the signal level about the first photoelectric converter 61 obtained in the above.

It is to be noted that, at the time of reading of the pixel signal obtained in the first photoelectric converter 61, the pixel signal may be read out in the state in which the third transfer gate part 68 is turned on, i.e. in the state in which the FD part 63 and the node 81 are connected. In this case, the efficiency of conversion of the charge to the electrical signal, i.e. the sensitivity of the first photoelectric converter 61, can be adjusted. However, in such a case, the reset gate part 70 needs to have been turned off at the time of reading of the signal level.

At a clock time t54, the vertical drive unit 22 turns off the drive signal RST to turn off the reset gate part 70 and release the reset of the node 81.

At a clock time t55, the vertical drive unit 22 turns on the drive signal FDG and the drive signal FCG to turn on the third transfer gate part 68 and the fourth transfer gate part 69. This makes the state in which the charge accumulating part 67, the node 81, and the FD part 63 are electrically connected.

In the charge accumulating part 67, the charge transferred from the second photoelectric converter 64 at the time of exposure operation is accumulated. Thus, when the charge accumulating part 67, the node 81, and the FD part 63 are electrically connected, the state in which the charge obtained by the exposure in the second photoelectric converter 64 is accumulated in these charge accumulating part 67, node 81, and FD part 63 is obtained.

Along with this, a signal according to the amount of charge accumulated in the charge accumulating part 67, the node 81, and the FD part 63 is output from the amplification transistor 71 to the column processing unit 23 via the selection transistor 72 and the vertical signal line 27. The column processing unit 23 reads the signal output from the amplification transistor 71 in this manner as the signal level of the pixel signal obtained by the exposure in the second photoelectric converter 64.

At a clock time t56, the vertical drive unit 22 turns on the drive signal RST to turn on the reset gate part 70. Thereby, the charge accumulating part 67, the node 81, and the FD part 63 are reset. Then, at a clock time t57, the vertical drive unit 22 turns off the drive signal RST to turn off the reset gate part 70 and release the reset of the charge accumulating part 67, the node 81, and the FD part 63.

In this case, in the state in which the charge accumulating part 67, the node 81, and the FD part 63 have been reset, a signal according to the amount of charge accumulated in these charge accumulating part 67, node 81, and FD part 63 is output from the amplification transistor 71 to the column processing unit 23 via the selection transistor 72 and the vertical signal line 27. The column processing unit 23 reads the signal output from the amplification transistor 71 in this manner as the reset level of the pixel signal obtained in the second photoelectric converter 64.

In the column processing unit 23, the pixel signal obtained by the exposure in the second photoelectric converter 64 is generated from the reset level and the signal level about the second photoelectric converter 64 obtained in the above.

Then, the pixel signal about the first photoelectric converter 61 and the pixel signal about the second photoelectric converter 64 obtained in this manner are subjected to HDR rendering in the signal processing unit 28 and so forth at the subsequent stage to be turned to pixel signals of the pixels of a photographed image of one frame for which the dynamic range is extended.

At a clock time t58, the vertical drive unit 22 turns on the drive signal RST to turn on the reset gate part 70. In addition, the vertical drive unit 22 turns on the drive signal TGL and the drive signal TGS to turn on the first transfer gate part 62 and the second transfer gate part 66. Thereby, the first photoelectric converter 61, the second photoelectric converter 64, the charge accumulating part 67, the node 81, and the FD part 63 are reset.

Thereafter, at a clock time t59, the vertical drive unit 22 turns off the drive signal TGL and the drive signal TGS to turn off the first transfer gate part 62 and the second transfer gate part 66. Moreover, at a clock time t60, the vertical drive unit 22 turns off the drive signal RST to turn off the reset gate part 70. Thereby, the reset of the respective parts of the pixel 51 is released.

Then, at a clock time t61, the vertical drive unit 22 turns off the drive signal FCG to turn off the fourth transfer gate part 69. At a clock time t62, the vertical drive unit 22 turns off the drive signal FDG to turn off the third transfer gate part 68. This makes the state in which the charge accumulating part 67, the node 81, and the FD part 63 are electrically isolated.

Furthermore, at a clock time t62, the vertical drive unit 22 turns off the drive signal SEL to turn off the selection transistor 72 and cancel the selected state of the pixel 51.

In the above-described manner, the solid-state imaging element 11 reads out the pixel signals obtained by exposure of a respective one of the first photoelectric converter 61 and the second photoelectric converter 64 in turn. Due to this, the dynamic range of the photographed image can be sufficiently extended. In addition, the occurrence of flicker, motion blur, and rendering artifact can be suppressed and photographed images with higher quality can be obtained.

Modification Example 1 of First Embodiment

<Configuration Example of Pixel>

It is to be noted that, in the above, the case in which the unit pixel provided in the pixel array unit 21 has the configuration depicted in FIG. 2 is described. However, the configuration of the unit pixel is not limited to the example depicted in FIG. 2. For example, three or more photoelectric converters may be allowed to be provided in the pixel 51, which is the unit pixel, and the above-described non-linear burst driving may be allowed to be carried out regarding part or all of these photoelectric converters. To carry out the non-linear burst driving, it suffices that an anti-blooming gate part be connected to the photoelectric converter and a charge accumulating part be connected to the photoelectric converter with the intermediary of a transfer gate part.

Figure 7:
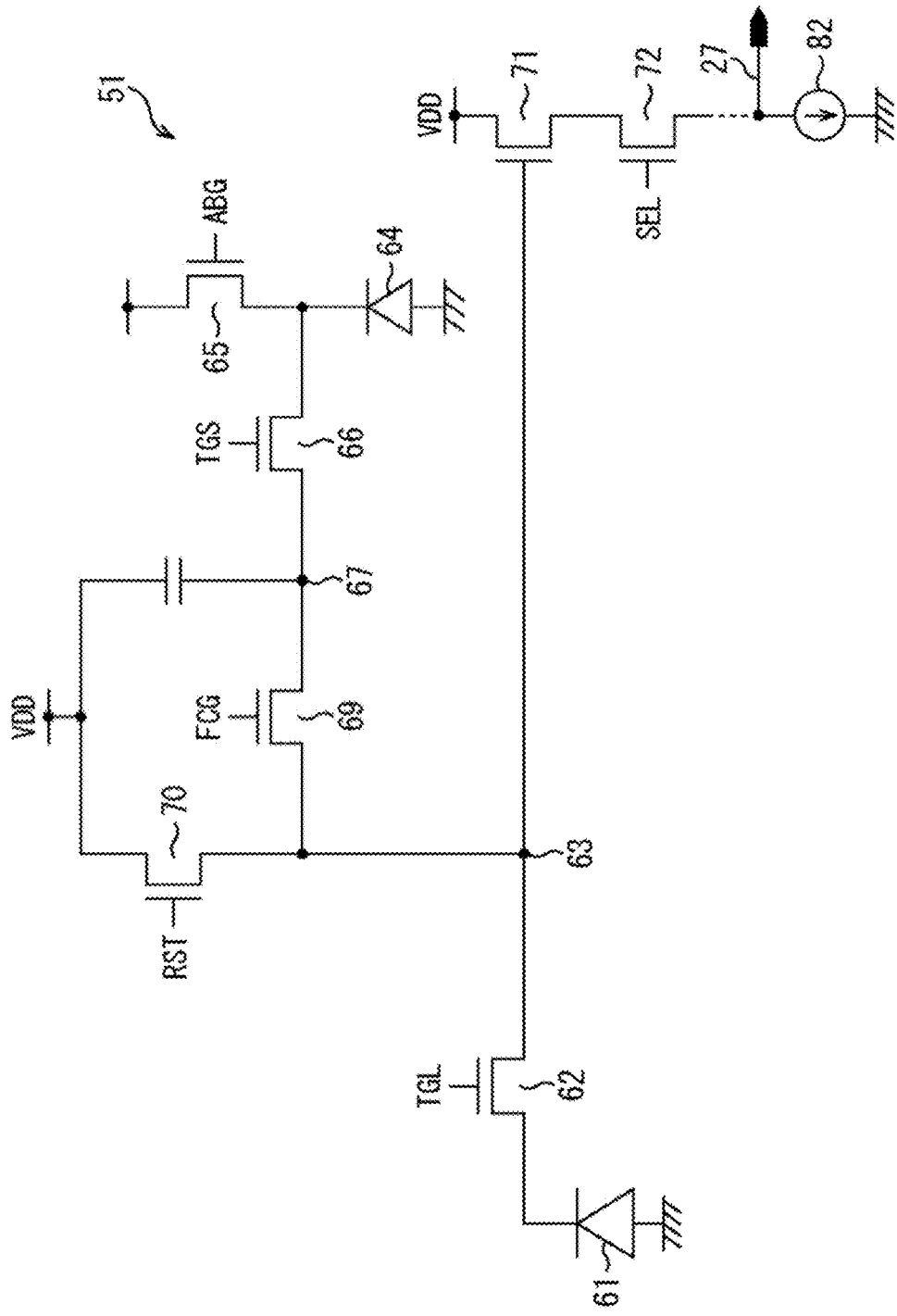
FIG. 7 is a diagram depicting another configuration example of the pixel.

Furthermore, it is also possible to employ e.g. a configuration depicted in FIG. 7 as the configuration of the pixel 51. It is to be noted that, in FIG. 7, a part corresponding to the case in FIG. 2 is given the same symbol and description thereof is omitted as appropriate.

The configuration of the pixel 51 depicted in FIG. 7 is different from the configuration of the pixel 51 depicted in FIG. 2 in that the third transfer gate part 68 is not provided, and is the same configuration as the pixel 51 depicted in FIG. 2 in the other points.

Therefore, in the pixel 51 depicted in FIG. 7, the reset gate part 70 and the fourth transfer gate part 69 are connected to the FD part 63. Thus, for example, the FD part 63 is reset when the reset gate part 70 is turned on, and a charge accumulated in the charge accumulating part 67 is transferred to the FD part 63 when the fourth transfer gate part 69 is turned on.

Modification Example 2 of First Embodiment

<Configuration Example of Pixel>

Figure 8:
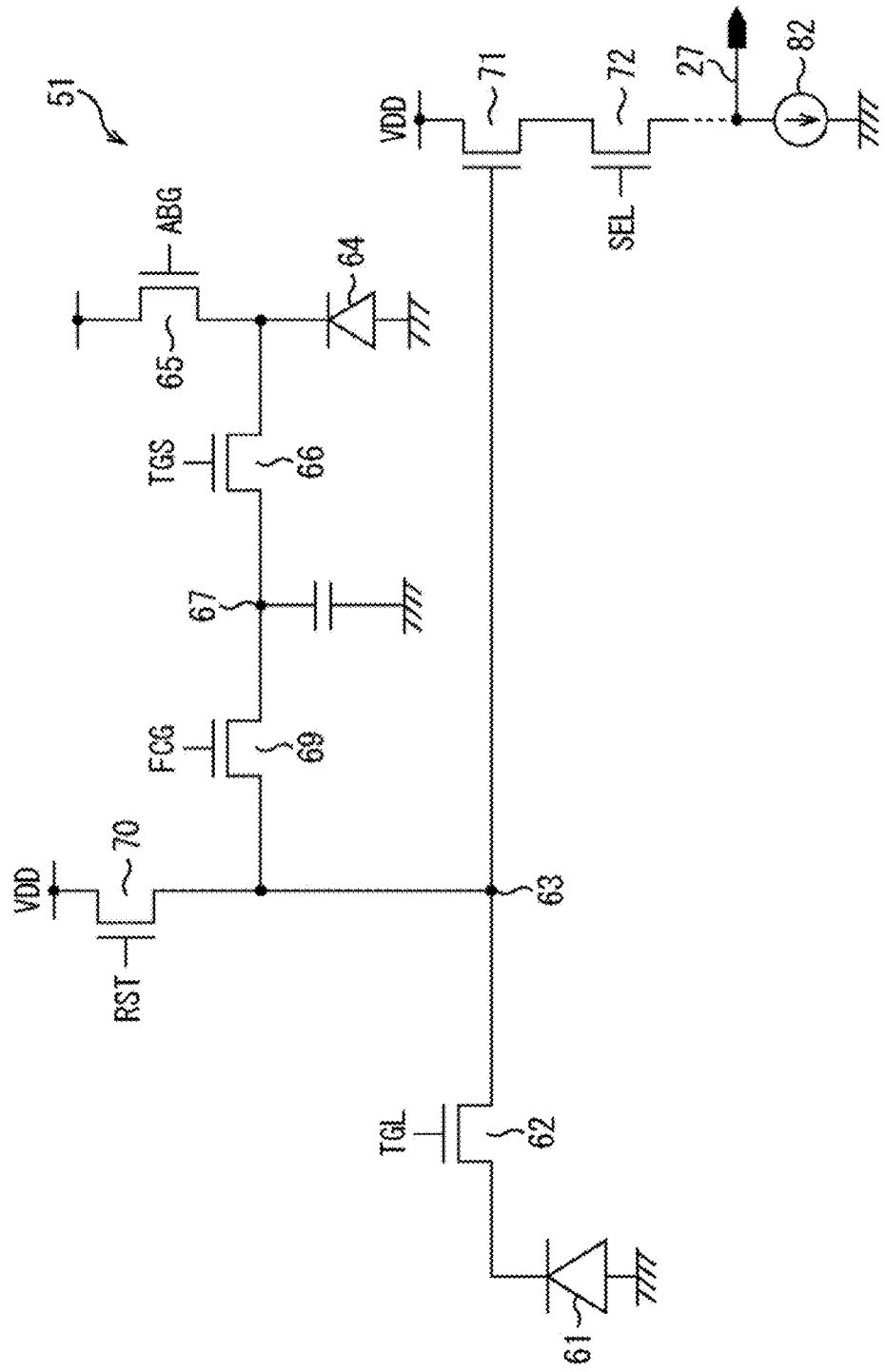
FIG. 8 is a diagram depicting another configuration example of the pixel.

Furthermore, it is also possible to employ e.g. a configuration depicted in FIG. 8 as the configuration of the pixel 51. It is to be noted that, in FIG. 8, a part corresponding to the case in FIG. 7 is given the same symbol and description thereof is omitted as appropriate.

The configuration of the pixel 51 depicted in FIG. 8 is different from the configuration of the pixel 51 depicted in FIG. 7 in that the connection subject of the counter electrode of the charge accumulating part 67 is the ground, and is the same configuration as the pixel 51 depicted in FIG. 7 in the other points.

Modification Example 3 of First Embodiment

<Configuration Example of Pixel>

Figure 9:
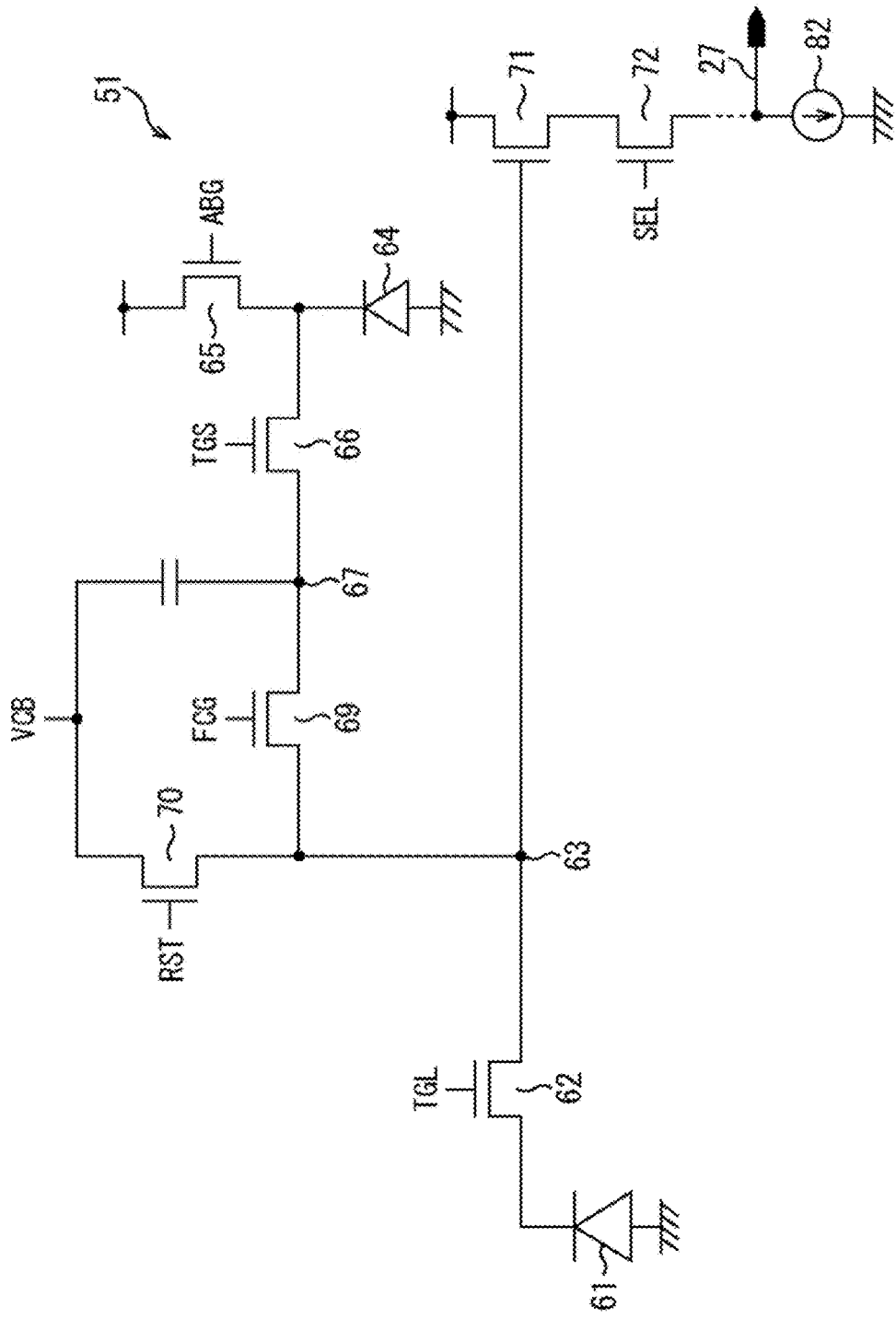
FIG. 9 is a diagram depicting another configuration example of the pixel.

Moreover, it is also possible to employ e.g. a configuration depicted in FIG. 9 as the configuration of the pixel 51. It is to be noted that, in FIG. 9, a part corresponding to the case in FIG. 7 is given the same symbol and description thereof is omitted as appropriate.

The configuration of the pixel 51 depicted in FIG. 9 is different from the configuration of the pixel 51 depicted in FIG. 7 in that the counter electrode of the charge accumulating part 67 and the reset gate part 70 are connected to a variable power supply VCB instead of the power supply VDD, and is the same configuration as the pixel 51 depicted in FIG. 7 in the other points.

A supply voltage VCB of the variable power supply VCB is set to a high-level voltage VH or a low-level voltage VL for example. For example, the voltage VH is set to a level similar to that of the supply voltage VDD and the voltage VL is set to the ground level.

Second Embodiment

<Configuration Example of Pixel>

Incidentally, the vehicle is provided with a headlight for recognition of the front side at night and a subject that exists on the vehicle front side is illuminated by the headlight to thereby allow recognition of the subject. However, a high beam for recognizing a subject that exists at a long distance on the vehicle front side is dazzling for persons who ride oncoming cars and the eyes of other persons that exist on the front side. Therefore, it is undesirable to light the high beam for a long time. Thus, as a method for preventing the headlight high beam from being dazzling, flash control to cause the high beam to be emitted only instantly is conceivable.

In general, when recognition of the front side is carried out on a vehicle by an in-vehicle camera, light reception by a photoelectric converter with high sensitivity when it is dark. However, in the case of carrying out the flash control to cause the high beam to be instantaneously emitted (lit), when the instantaneous light emission is captured by a conventional 1/60 accumulation camera, i.e. a camera whose exposure time for one frame is 1/60 seconds, the high beam is buried in ambient light and becomes invisible because the exposure time is too long relative to the emission time of the high beam. That is, with a photographed image obtained by photographing, it is difficult to recognize a subject that is illuminated by the high beam and is located at a long distance.

As above, it is difficult to achieve both preventing persons that exist on the front side of the vehicle from feeling the high beam dazzling and surely recognizing a subject that is illuminated by the high beam and is located at a long distance.

Thus, in the present technique, in the solid-state imaging element 11 depicted in FIG. 1, exposure is carried out in synchronization with a high beam instantaneously emitted by flash control (hereinafter, referred to also as flash high beam) and a signal obtained as the result is subjected to amplification processing at a maximum to allow a remote subject to be recognized in the photographed image.

In such a case, for example in the pixel 51 depicted in FIG. 2, the FD part 63 connected to the first photoelectric converter 61 with the intermediary of the first transfer gate part 62 can be used as a signal accumulating part that accumulates a charge obtained by exposure. Furthermore, if the capacitance of the FD part 63 is set low and the efficiency of conversion of the charge in the FD part 63 to an electrical signal is set high, even a subject that exists at a long distance on the vehicle front side can be efficiently recognized (detected).

<About Operation of Solid-State Imaging Element>

Next, with reference to a timing chart of FIG. 10, operation of the solid-state imaging element 11 in the case in which exposure is carried out in synchronization with emission of a high beam will be described.

Figure 10:
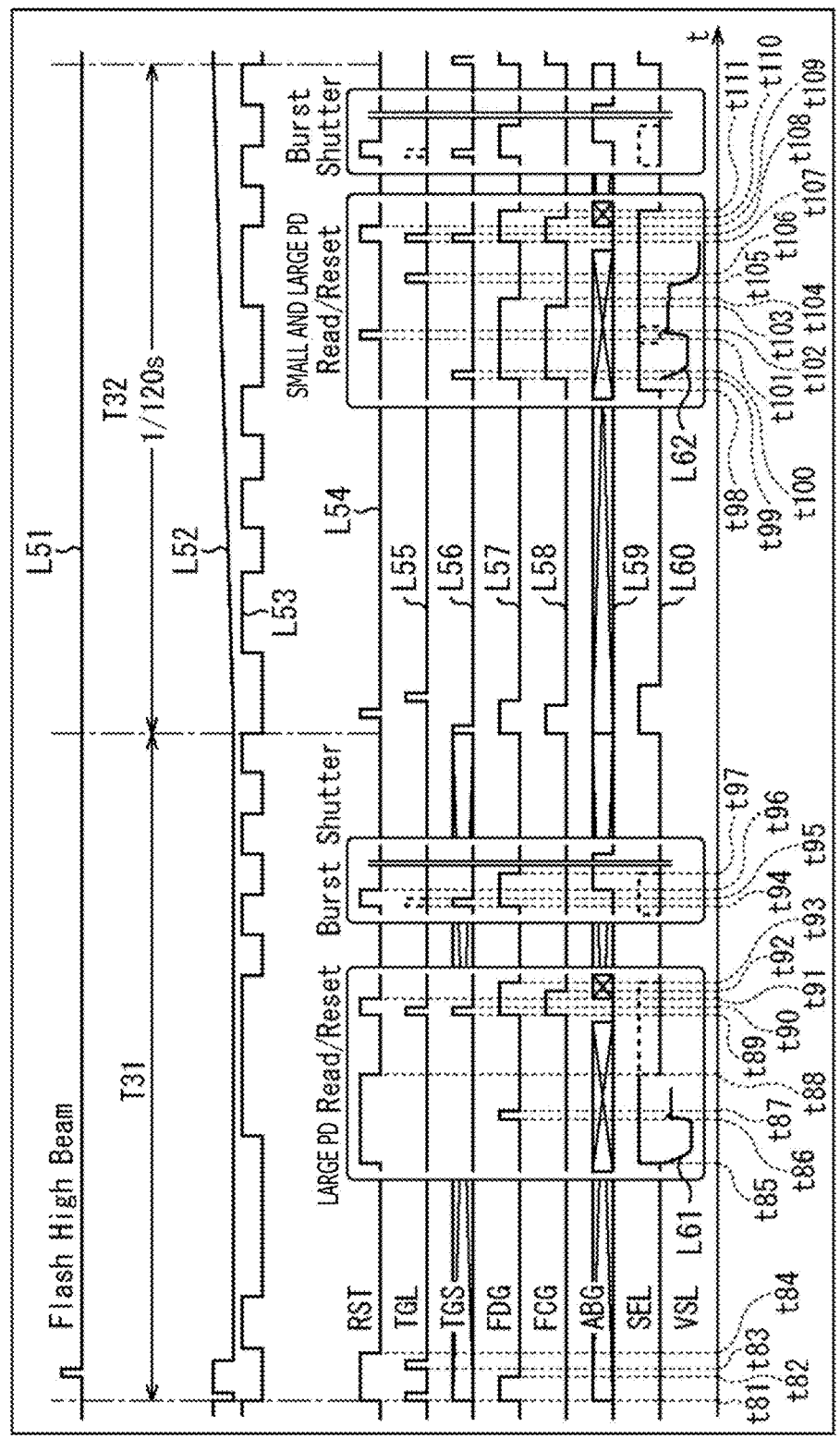
FIG. 10 is a timing chart for explaining driving of the pixel.

It is to be noted that, in FIG. 10, a polygonal line L51 represents the emission timing of a flash high beam and the upwardly-projection state represents the state in which the flash high beam is emitted. Furthermore, a polygonal line L52 and a polygonal line L53 represent the exposure timing of the first photoelectric converter 61 and the exposure timing of the second photoelectric converter 64. In particular, periods in which a respective one of the polygonal line L52 and the polygonal line L53 is upwardly projection represent exposure periods. Furthermore, the part in which the polygonal line L52 gradually rises in the upward direction in the diagram represents the state in which a charge is gradually accumulated in the first photoelectric converter 61.

A polygonal line L54 to a polygonal line L60 represent the drive signal RST, the drive signal TGL, the drive signal TGS, the drive signal FDG, the drive signal FCG, the drive signal ABG, and the drive signal SEL. Furthermore, regarding each drive signal, the upwardly-projection state in the diagram represents the state in which the drive signal is turned on. Moreover, a curve L61 and a curve L62 represent the potential of the vertical signal line 27 at the time of reading of the pixel signal.

In FIG. 10, a period of 1/60 seconds that is the period of one frame of a normal photographed image is divided into a period T31 and a period T32 and these period T31 and period T32 are sections of 1/120 seconds. Specifically, here the frame rate of the photographed image is set twice the normal frame rate and the example of FIG. 10 is an example in which exposure synchronized with the flash high beam is carried out in the period T31 and photographing of a normal photographed image is carried out in the period T32.

This example is an example in which the flash high beam is emitted only one time in the period of normal one frame composed of the period T31 and the period T32 in the state in which a split high beam that illuminates only a partial region by a high beam and a low beam are emitted in turn at appropriate timings.

First, at a clock time t81 that is a timing immediately before emission of the flash high beam, the vertical drive unit 22 turns on the drive signal RST, the drive signal TGL, and the drive signal FDG to turn on the reset gate part 70, the first transfer gate part 62, and the third transfer gate part 68. Thereby, the first photoelectric converter 61, the FD part 63, and the node 81 are electrically connected and these first photoelectric converter 61, FD part 63, and node 81 are reset.

Thereafter, the vertical drive unit 22 turns off the drive signal TGL to release the reset of the first photoelectric converter 61 and start exposure in the first photoelectric converter 61.

Then, at a clock time t82 that is the emission timing of the flash high beam, the vertical drive unit 22 turns off the drive signal FDG to turn off the third transfer gate part 68 and electrically isolate the FD part 63 and the node 81.

Furthermore, at a clock time t83 that is the timing of the emission end of the flash high beam, the vertical drive unit 22 turns on the drive signal TGL to turn on the first transfer gate part 62 and transfer a charge obtained by photoelectric conversion in the first photoelectric converter 61 to the FD part 63 and accumulate the charge.

Thereafter, the vertical drive unit 22 turns off the drive signal TGL to turn off the first transfer gate part 62 and end the transfer of the charge obtained by the photoelectric conversion in the first photoelectric converter 61 to the FD part 63. Due to this, the exposure in the first photoelectric converter 61 ends. It is to be noted that the exposure of the first photoelectric converter 61 here is carried out in all pixels 51 concurrently.

As above, exposure in the first photoelectric converter 61 with higher sensitivity is carried out with timing and exposure time synchronized with the emission period of the flash high beam, which is a pulse emission light source. This makes it possible to recognize a subject that exists at a long distance on the vehicle front side more surely.

At a clock time t84, the vertical drive unit 22 turns off the drive signal RST to turn off the reset gate part 70 and release the reset of the node 81.

When the charge obtained by the exposure in the first photoelectric converter 61 is transferred to the FD part 63 and is accumulated in this manner, the vertical drive unit 22 selects the respective pixel rows in turn and reads out pixel signals from all pixels 51.

Specifically, at a clock time t85, the vertical drive unit 22 turns on the drive signal SEL supplied to the selected pixel row to turn on the selection transistor 72 and set the pixels 51 on the pixel row to the selected state. Furthermore, the vertical drive unit 22 turns on the drive signal RST to turn on the reset gate part 70 and set the node 81 to the reset state.

When the pixel 51 is set to the selected state in this manner, the potential of the vertical signal line 27 changes according to the amount of charge accumulated in the FD part 63 as illustrated by the curve L61.

Specifically, a signal according to the amount of charge obtained by the exposure in the first photoelectric converter 61 is output from the amplification transistor 71 to the column processing unit 23 via the selection transistor 72 and the vertical signal line 27. The column processing unit 23 reads the signal output from the amplification transistor 71 in this manner as the signal level of the pixel signal obtained by the exposure in the first photoelectric converter 61.

At a clock time t86, the vertical drive unit 22 turns on the drive signal FDG to turn on the third transfer gate part 68 and electrically connect the FD part 63 and the node 81. Thereby, the FD part 63 and the node 81 are reset.

At a clock time t87, the vertical drive unit 22 turns off the drive signal FDG to turn off the third transfer gate part 68 and electrically isolate the FD part 63 and the node 81. Thereby, the reset of the FD part 63 is released. Due to this, the potential of the vertical signal line 27 changes according to the amount of charge accumulated in the FD part 63 as illustrated by the curve L61.

In this case, in the state in which the FD part 63 has been reset, a signal according to the amount of charge accumulated in the FD part 63 is output from the amplification transistor 71 to the column processing unit 23 via the selection transistor 72 and the vertical signal line 27. The column processing unit 23 reads the signal output from the amplification transistor 71 in this manner as the reset level of the pixel signal obtained in the first photoelectric converter 61.

Then, in the column processing unit 23, the pixel signal obtained by the exposure in the first photoelectric converter 61 is generated from the reset level and the signal level about the first photoelectric converter 61 obtained in the above. Due to this, a photographed image for recognizing a subject that exists at a long distance on the vehicle front side, photographed by using the flash high beam as the illumination light source, is obtained.

When the pixel signal is read out, at a clock time t88, the vertical drive unit 22 turns off the drive signal RST to turn off the reset gate part 70 and release the reset of the node 81. Furthermore, the vertical drive unit 22 turns off the drive signal SEL according to need to turn off the selection transistor 72 and cancel the selected state of the pixel 51.

Moreover, at a clock time t89, the vertical drive unit 22 turns on the drive signal RST, the drive signal TGL, the drive signal TGS, the drive signal FDG, and the drive signal FCG. Thereby, the reset gate part 70, the first transfer gate part 62, the second transfer gate part 66, the third transfer gate part 68, and the fourth transfer gate part 69 are turned on and the first photoelectric converter 61, the FD part 63, the node 81, the charge accumulating part 67, and the second photoelectric converter 64 are electrically connected. Furthermore, these first photoelectric converter 61, FD part 63, node 81, charge accumulating part 67, and second photoelectric converter 64 are reset.

At a clock time t90, the vertical drive unit 22 turns off the drive signal TGL and the drive signal TGS to turn off the first transfer gate part 62 and the second transfer gate part 66 and start exposure in the first photoelectric converter 61 and the second photoelectric converter 64 until the next frame. The exposure started here is exposure for photographing of a normal photographed image.

It is to be noted that, regarding the exposure of the first photoelectric converter 61, the above-described phase shift control, i.e. reset operation of the first photoelectric converter 61 at an arbitrary timing, may be carried out so that the exposure may be started at a desired timing.

At a clock time t91, the vertical drive unit 22 turns off the drive signal RST to turn off the reset gate part 70 and release the reset of the FD part 63, the node 81, and the charge accumulating part 67. Then, at a clock time t92, the vertical drive unit 22 turns off the drive signal FCG to turn off the fourth transfer gate part 69 and electrically isolate the node 81 and the charge accumulating part 67.

Moreover, at a clock time t93, the vertical drive unit 22 turns off the drive signal FDG to turn off the third transfer gate part 68 and electrically isolate the node 81 and the FD part 63.

The above operation from the clock time t85 to the clock time t93 is carried out for each pixel row set to the selected state in turn.

Thereafter, the vertical drive unit 22 carries out the above-described non-linear burst driving of the second photoelectric converter 64 while turning on and off the drive signal TGS and the drive signal ABG as appropriate.

For example, at a clock time t94, the vertical drive unit 22 turns on the drive signal RST and the drive signal FDG to turn on the reset gate part 70 and the third transfer gate part 68. In addition, the vertical drive unit 22 turns on the drive signal TGS to turn on the second transfer gate part 66.

Thereby, the node 81 and the FD part 63 are electrically connected and these node 81 and FD part 63 are reset. In addition, a charge obtained by photoelectric conversion in the second photoelectric converter 64 is transferred from the second photoelectric converter 64 to the charge accumulating part 67 via the second transfer gate part 66 and is accumulated.

At a clock time t95, the vertical drive unit 22 turns off the drive signal TGS to turn off the second transfer gate part 66 and end the transfer of the charge from the second photoelectric converter 64. That is, the exposure ends. Furthermore, at the clock time t94 and the clock time t95, the first photoelectric converter 61 may be reset as appropriate as illustrated by a dotted-line part of the drive signal TGL and thereby the start clock time of exposure in the first photoelectric converter 61 may be adjusted to an arbitrary clock time.

At a clock time t96, the vertical drive unit 22 turns off the drive signal RST to turn off the reset gate part 70 and release the reset of the node 81 and the FD part 63. In addition, the vertical drive unit 22 turns on the drive signal ABG to turn on the anti-blooming gate part 65 and reset the second photoelectric converter 64.

At a clock time t97, the vertical drive unit 22 turns off the drive signal FDG to turn off the third transfer gate part 68 and electrically isolate the node 81 and the FD part 63. Thereafter, the vertical drive unit 22 turns off the drive signal ABG at a proper timing to turn off the anti-blooming gate part 65 and start exposure in the second photoelectric converter 64.

The vertical drive unit 22 carries out non-linear burst driving of the second photoelectric converter 64 by repeatedly carrying out the driving from the clock time t94 to the clock time t97 non-linearly. In FIG. 10, an example in which the total exposure time and total non-exposure time of the second photoelectric converter 64 have the same length is depicted.

Furthermore, when the timing of pixel signal reading from the pixel row in which the pixel 51 is included comes, at a clock time t98, the vertical drive unit 22 turns on the drive signal SEL to turn on the selection transistor 72 and set the pixel 51 to the selected state.

At a clock time t99, the vertical drive unit 22 turns on the drive signal TGS to turn on the second transfer gate part 66. In addition, the vertical drive unit 22 turns on the drive signal FDG and the drive signal FCG to turn on the third transfer gate part 68 and the fourth transfer gate part 69.

This makes the state in which the charge accumulating part 67, the node 81, and the FD part 63 are electrically connected. In addition, a charge obtained by photoelectric conversion in the second photoelectric converter 64 is transferred to the charge accumulating part 67, the node 81, and the FD part 63 via the second transfer gate part 66 and is accumulated.

Furthermore, at a clock time t100, the vertical drive unit 22 turns off the drive signal TGS to turn off the second transfer gate part 66 and end the transfer of the charge from the second photoelectric converter 64. Due to this, the exposure in the second photoelectric converter 64 ends.

When such operation is carried out, the state in which the charge obtained by the exposure in the second photoelectric converter 64 is accumulated in the charge accumulating part 67, the node 81, and the FD part 63 is obtained, and the potential of the vertical signal line 27 changes according to the amount of accumulated charge as illustrated by the curve L62.

Along with this, a signal according to the amount of charge accumulated in the charge accumulating part 67, the node 81, and the FD part 63 is output from the amplification transistor 71 to the column processing unit 23 via the selection transistor 72 and the vertical signal line 27. The column processing unit 23 reads the signal output from the amplification transistor 71 in this manner as the signal level of the pixel signal obtained by the exposure in the second photoelectric converter 64.

At a clock time t101, the vertical drive unit 22 turns on the drive signal RST to turn on the reset gate part 70 and reset the charge accumulating part 67, the node 81, and the FD part 63. Due to this, as illustrated by the curve L62, the potential of the vertical signal line 27 changes according to the amount of charge accumulated in the charge accumulating part 67, the node 81, and the FD part 63 at the time of the reset.

At a clock time t102, the vertical drive unit 22 turns off the drive signal RST to turn off the reset gate part 70 and release the reset of the charge accumulating part 67, the node 81, and the FD part 63.

In this case, in the state in which the charge accumulating part 67, the node 81, and the FD part 63 have been reset, a signal according to the amount of charge accumulated in these charge accumulating part 67, node 81, and FD part 63 is output from the amplification transistor 71 to the column processing unit 23 via the selection transistor 72 and the vertical signal line 27.

The column processing unit 23 reads the signal output from the amplification transistor 71 in this manner as the reset level of the pixel signal obtained in the second photoelectric converter 64. In the column processing unit 23, the pixel signal obtained by the exposure in the second photoelectric converter 64 is generated from the reset level and the signal level about the second photoelectric converter 64 obtained in the above.

At a clock time t103, the vertical drive unit 22 turns off the drive signal FCG to turn off the fourth transfer gate part 69. At a clock time t104, the vertical drive unit 22 turns off the drive signal FDG to turn off the third transfer gate part 68. This makes the state in which the charge accumulating part 67, the node 81, and the FD part 63 are electrically isolated, and the potential of the vertical signal line 27 changes according to the amount of charge accumulated in the FD part 63 in the reset state as illustrated by the curve L62.

In this case, in the state in which the FD part 63 has been reset, a signal according to the amount of charge accumulated in the FD part 63 is output from the amplification transistor 71 to the column processing unit 23 via the selection transistor 72 and the vertical signal line 27. The column processing unit 23 reads the signal output from the amplification transistor 71 in this manner as the reset level of the pixel signal obtained in the first photoelectric converter 61.

At a clock time t105, the vertical drive unit 22 turns on the drive signal TGL to turn on the first transfer gate part 62. Thereby, a charge obtained by photoelectric conversion in the first photoelectric converter 61 is transferred from the first photoelectric converter 61 to the FD part 63 via the first transfer gate part 62 and is accumulated. Moreover, at a clock time t106, the vertical drive unit 22 turns off the drive signal TGL and turns off the first transfer gate part 62 to end the transfer of the charge from the first photoelectric converter 61. Due to this, the exposure in the first photoelectric converter 61 ends.

It is to be noted that, here, the example in which the exposure of the first photoelectric converter 61 is carried out until immediately before reading of the pixel signal obtained in the first photoelectric converter 61 is described. However, in the case of ending the exposure of the first photoelectric converter 61 before start of reading of the pixel signal, the driving described with reference to the above-described FIG. 6 is carried out.

Upon the end of the exposure in the first photoelectric converter 61, the state in which the charge transferred from the first photoelectric converter 61 is accumulated in the FD part 63 is obtained, and the potential of the vertical signal line 27 changes according to the amount of charge accumulated in the FD part 63 as illustrated by the curve L62.

Thus, a signal according to the amount of charge accumulated in the FD part 63, i.e. the amount of charge obtained by the exposure in the first photoelectric converter 61, is output from the amplification transistor 71 to the column processing unit 23 via the selection transistor 72 and the vertical signal line 27. The column processing unit 23 reads the signal output from the amplification transistor 71 in this manner as the signal level of the pixel signal obtained by the exposure in the first photoelectric converter 61.

In the column processing unit 23, the pixel signal obtained by the exposure in the first photoelectric converter 61 is generated from the reset level and the signal level about the first photoelectric converter 61 obtained in the above. Then, the pixel signal about the first photoelectric converter 61 and the pixel signal about the second photoelectric converter 64 obtained in this manner are subjected to HDR rendering to be turned to pixel signals of the pixels of a photographed image for which the dynamic range is extended.

At a clock time t107, the vertical drive unit 22 turns on the drive signal RST, the drive signal TGL, the drive signal TGS, the drive signal FCG, and the drive signal FDG to turn on the reset gate part 70, the first transfer gate part 62, the second transfer gate part 66, the fourth transfer gate part 69, and the third transfer gate part 68.

Thereby, the first photoelectric converter 61, the FD part 63, the node 81, the charge accumulating part 67, and the second photoelectric converter 64 are electrically connected and these first photoelectric converter 61, FD part 63, node 81, charge accumulating part 67, and second photoelectric converter 64 are reset.

At a clock time t108, the vertical drive unit 22 turns off the drive signal TGL and the drive signal TGS to turn off the first transfer gate part 62 and the second transfer gate part 66. Furthermore, at a clock time t109, the vertical drive unit 22 turns off the drive signal RST to turn off the reset gate part 70 and release the reset of the FD part 63, the node 81, and the charge accumulating part 67.

At a clock time t110, the vertical drive unit 22 turns off the drive signal FCG to turn off the fourth transfer gate part 69 and electrically isolate the charge accumulating part 67 and the node 81. Moreover, at a clock time t111, the vertical drive unit 22 turns off the drive signal FDG to turn off the third transfer gate part 68 and electrically isolate the FD part 63 and the node 81. In addition, the vertical drive unit 22 turns off the drive signal SEL to turn off the selection transistor 72 and cancel the selected state of the pixel 51.

By carrying out the shutter driving described above, in $\frac{1}{60}$ seconds as the period of normal one frame, a photographed image for recognizing a subject that exists at a long distance on the vehicle front side, photographed by using the flash high beam as the illumination light source, and a normal photographed image can be simultaneously achieved.

Third Embodiment

<Configuration Example of Pixel>

Incidentally, in the configuration of the pixel 51 depicted in FIG. 2, the anti-blooming gate part 65 is connected to the second photoelectric converter 64 in the two photoelectric converters provided in the pixel 51 and non-linear burst driving is enabled. In contrast, an anti-blooming gate part is not connected to the first photoelectric converter 61 and a configuration in which burst driving is impossible is made.

However, if a configuration in which an anti-blooming gate part is connected also to the first photoelectric converter 61 is employed, a higher-value-added solid-state imaging element 11, i.e. a higher-value-added in-vehicle camera, can be provided.

Figure 11:
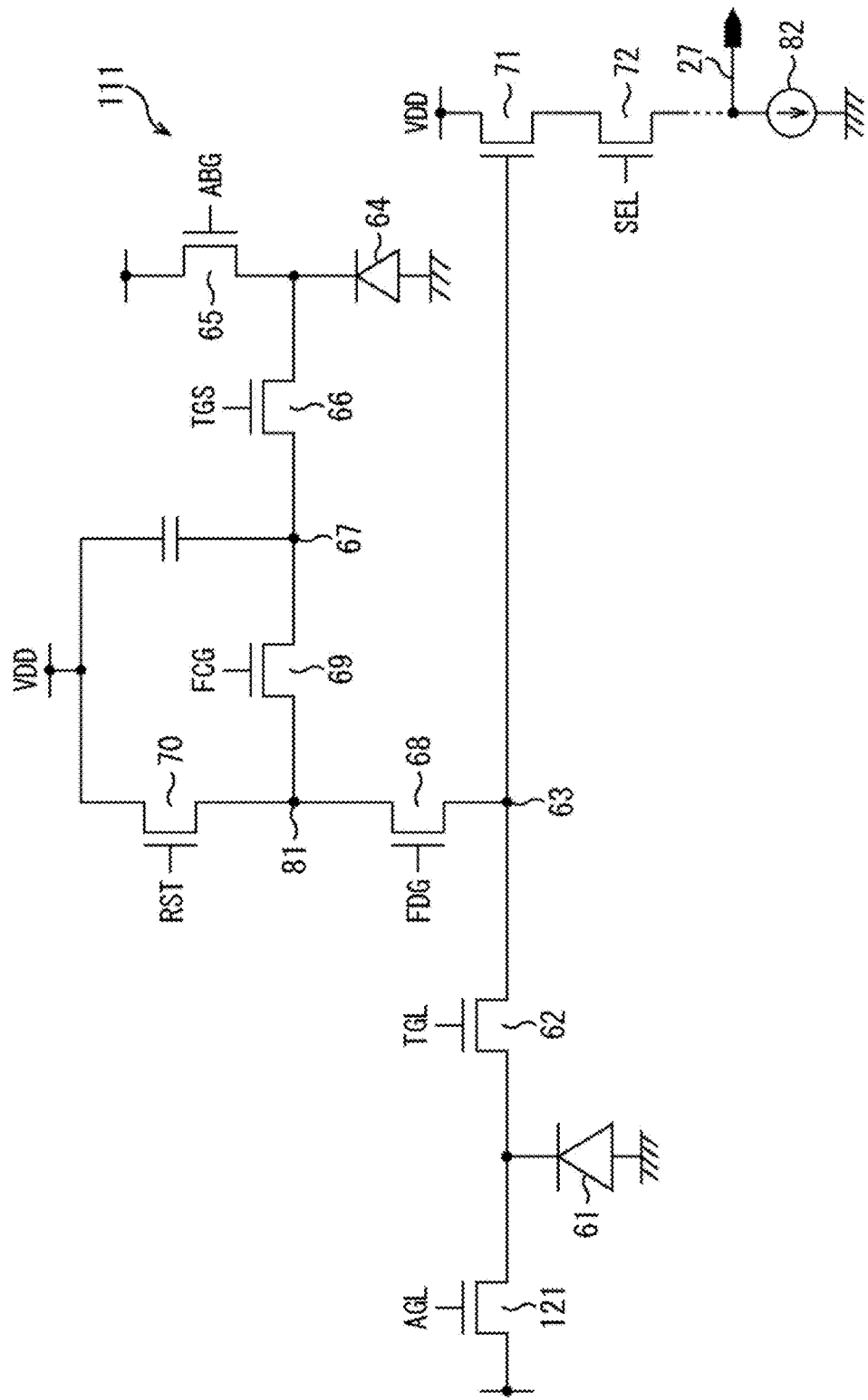
FIG. 11 is a diagram depicting another configuration example of the pixel.

In such a case, each unit pixel provided in the pixel array unit 21 is configured as depicted in FIG. 11 for example. It is to be noted that, in FIG. 11, a part corresponding to the case in FIG. 2 is given the same symbol and description thereof is omitted as appropriate.

A pixel 111 that is the unit pixel depicted in FIG. 11 includes the first photoelectric converter 61, the first transfer gate part 62, the FD part 63, the second photoelectric converter 64, the anti-blooming gate part 65, the second transfer gate part 66, the charge accumulating part 67, the third transfer gate part 68, the fourth transfer gate part 69, the reset gate part 70, the amplification transistor 71, the selection transistor 72, and an anti-blooming gate part 121.

The configuration of the pixel 111 is different from the configuration of the pixel 51 of FIG. 2 in that the anti-blooming gate part 121 is connected to the first photoelectric converter 61, and has the same configuration as the pixel 51 in the other points.

Specifically, in the pixel 111, a region that accumulates a charge is connected to each photoelectric converter in the pixel 111 with the intermediary of a transfer gate part and an anti-blooming gate part is also connected to each photoelectric converter, which provides a configuration in which non-linear burst driving of these photoelectric converters is possible.

The anti-blooming gate part 121 is connected between the first photoelectric converter 61 and the power supply VDD and a drive signal AGL is supplied from the vertical drive unit 22 to the gate electrode of the anti-blooming gate part 121. When this drive signal AGL is turned on, the anti-blooming gate part 121 is turned on and a charge accumulated in the first photoelectric converter 61 is discharged via the anti-blooming gate part 121. That is, the potential of the first photoelectric converter 61 is reset to the level of the supply voltage VDD.

The configuration in which the charge accumulation region is connected to the photoelectric converter with the intermediary of the transfer gate part and the anti-blooming gate part is connected as above is a configuration that can implement a function of a ToF (Time of Flight) ranging sensor that measures the distance to a target object by a time-of-flight measurement method. Therefore, it is possible to cause the solid-state imaging element 11 provided with such pixels 111 to function also as the ToF ranging sensor.

In particular, because the pixel 111 is provided with photoelectric converters different in the sensitivity, the first photoelectric converter 61 having higher sensitivity and the second photoelectric converter 64 having lower sensitivity, a target object that has high luminance and is at a short distance and a target object that has low luminance and is at a long distance can be efficiently detected.

Here, the ToF ranging sensor will be described.

In recent years, ToF ranging sensors for personal computers, for games, and so forth have become generally commercially available. In these ToF ranging sensors, ranging is carried out based on a system called the Continuous Wave system.

In the Continuous Wave system, for example in 1/60 seconds as the one-frame period, reset of a photoelectric converter and transfer of a charge from the photoelectric converter to a charge accumulating part are repeatedly carried out at a frequency according to the time of flight over the target distance. Then, a ranging operation of obtaining the distance to the target object from a signal corresponding to the charge cumulatively accumulated in the one-frame period is carried out.

However, in the Continuous Wave system, external light and noise are also accumulated in the one-frame period. Therefore, the influence of ambient light noise in an outdoor space in the daytime or under the sunlight is large and it is impossible to surely measure the distance to the target object in some cases.

In recent years, as ToF ranging sensors for being mounted in a vehicle, sensors of a one pulse system that carry out operation from light emission to light reception in too short a time to receive the sunlight have become the mainstream.

For example, as a method for two-dimensionalizing this, there are a method in which 2D scan is carried out with one dot light source and one sensor, a method in which 1D scan is carried out with one line light source and one line sensor, and a non-scan method with a 2D flash light source and a 2D sensor, and sensors that carry our ranging by these methods have been commercialized.

<About Operation of Solid-State Imaging Element>

On the other hand, employing a laser as an on-vehicle headlight has also been implemented. Thus, ranging by use of the solid-state imaging element 11 becomes possible if the light reception timing in the solid-state imaging element 11 is synchronized with flash pulse driving of the 2D laser as this on-vehicle headlight.

Figure 12:
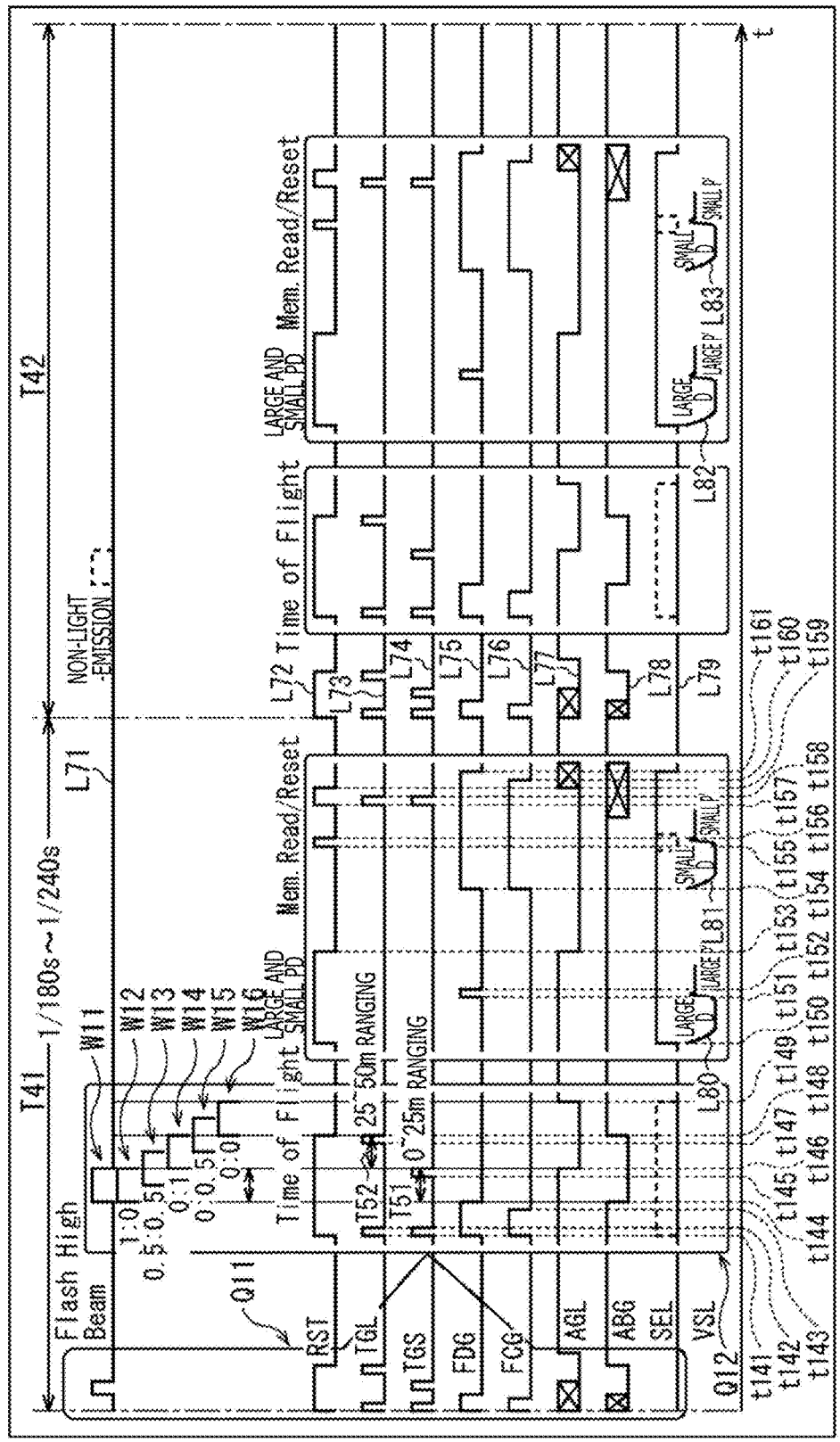
FIG. 12 is a timing chart for explaining driving of the pixel.

If the solid-state imaging element 11 is caused to function also as a ToF ranging sensor as above, the solid-state imaging element 11 is driven as depicted in FIG. 12 for example. Here, suppose that a headlight of a vehicle equipped with an in-vehicle sensor in which the solid-state imaging element 11 is mounted, i.e. a flash high beam, is used as the light source (pulse emission light source) at the time of ToF ranging.

It is to be noted that, in FIG. 12, a polygonal line L71 represents the emission timing of the flash high beam and the upwardly-projection state represents the state in which the flash high beam is emitted.

Furthermore, a polygonal line L72 to a polygonal line L79 represent the drive signal RST, the drive signal TGL, the drive signal TGS, the drive signal FDG, the drive signal FCG, the drive signal AGL, the drive signal ABG, and the drive signal SEL. Furthermore, regarding each drive signal, the upwardly-projection state in the diagram represents the state in which the drive signal is turned on. Moreover, a curve L80 to a curve L83 represent the potential of the vertical signal line 27 at the time of reading of the pixel signal. In addition, what is obtained by displaying a part indicated by an arrow Q11 in an enlarging manner in FIG. 12 is a part indicated by an arrow Q12.

In the case of allowing a normal photographed image to be also acquired simultaneously with execution of ToF ranging in the solid-state imaging element 11, it is impossible to use a Time to Digital Converter that directly reads the time like one used in the one pulse system.

Thus, in the solid-state imaging element 11, ranging is carried out based on a combination system using a PPM (Pulse Phase Modulation) system in which change in the phase is replaced by change in the signal level as in the Continuous Wave system.

In the PPM system, driving detection with shift of the phase by at least 180 degrees is necessary. However, by using the fact that reflected light is also large with an advanced phase of a short distance and reflected light is small with a retarded phase of a long distance, driving control in which a short-distance phase is received by the second photoelectric converter 64 and a long-distance phase is received by the first photoelectric converter 61 is employed.

It is to be noted that the sensitivity difference between the first photoelectric converter 61 and the second photoelectric converter 64 can be corrected because being known in advance for HDR rendering. Furthermore, a frame sequential system is used for removal of background light and noise to allow obtention of the difference between a signal frame and a background noise frame. Moreover, if a frame to acquire a normal photographed image based on the frame sequential system is also added, it is possible to achieve both acquisition of the normal photographed image and ToF ranging when three times to four times speed with respect to the normal frame rate is employed.

If the lowering of the frame rate due to the frame sequential system becomes a problem or if the time difference of the difference between a signal frame and a background noise frame becomes a problem in a moving subject, a 2-tap structure may be employed in which further one set of a charge accumulating part with the intermediary of a transfer gate part is added to each of the first photoelectric converter 61 and the second photoelectric converter 64. This can suppress the lowering of the frame rate and reduce the difference error at the time of moving subject. Such a 2-tap structure is a general structure in the ToF ranging sensor.

Subsequently, more concrete driving of the solid-state imaging element 11 will be described.

In this example, 1/60 seconds as the period of normal one frame are divided into three or four frames and ToF ranging and acquisition of a normal photographed image are carried out. Hereinafter, the frames obtained by dividing the normal one-frame period, which is 1/60 seconds, will be referred to also as divided frames.

In FIG. 12, each of a period T41 and a period T42 represents the period of the divided frame and these periods of the divided frames are set to 1/180 seconds, 1/240 seconds, or the like for example.

First, in the period T41 as the first divided frame, the vertical drive unit 22 controls ranging by a time-of-flight measurement method by controlling exposure in the first photoelectric converter 61 and the second photoelectric converter 64 based on the emission timing of a flash high beam that is a pulse emission light source.

Specifically, at a clock time t141 that is a timing immediately before emission of the flash high beam, the vertical drive unit 22 turns on the drive signal RST, the drive signal TGL, the drive signal TGS, the drive signal FDG, the drive signal FCG, the drive signal AGL, and the drive signal ABG. Thereby, the reset gate part 70, the first transfer gate part 62, the second transfer gate part 66, the third transfer gate part 68, the fourth transfer gate part 69, the anti-blooming gate part 121, and the anti-blooming gate part 65 are turned on.

As a result, the first photoelectric converter 61, the FD part 63, the node 81, the charge accumulating part 67, and the second photoelectric converter 64 are electrically connected and these first photoelectric converter 61, FD part 63, node 81, charge accumulating part 67, and second photoelectric converter 64 are reset.

At a clock time t142, the vertical drive unit 22 turns off the drive signal TGL and the drive signal TGS to turn off the first transfer gate part 62 and the second transfer gate part 66. Thereby, the first photoelectric converter 61 and the FD part 63 are electrically isolated and the second photoelectric converter 64 and the charge accumulating part 67 are electrically isolated.

At a clock time t143, the vertical drive unit 22 turns off the drive signal FCG to turn off the fourth transfer gate part 69 and electrically isolate the charge accumulating part 67 and the node 81.

Then, at a clock time t144 that is the emission timing of the flash high beam, the vertical drive unit 22 turns off the drive signal ABG to turn off the anti-blooming gate part 65 and release the reset of the second photoelectric converter 64. Thereby, exposure in the second photoelectric converter 64 is started.

Furthermore, at the clock time t144, the vertical drive unit 22 turns off the drive signal FDG to turn off the third transfer gate part 68 and electrically isolate the FD part 63 and the node 81.

At a clock time t145, the vertical drive unit 22 turns on the drive signal TGS to turn on the second transfer gate part 66. Thereby, the second photoelectric converter 64 and the charge accumulating part 67 are electrically connected and a charge obtained by photoelectric conversion in the second photoelectric converter 64 is transferred from the second photoelectric converter 64 to the charge accumulating part 67 via the second transfer gate part 66 and is accumulated.

Furthermore, at a clock time t146 that is the end timing of the emission of the flash high beam, the vertical drive unit 22 turns off the drive signal TGS to turn off the second transfer gate part 66 and end the transfer of the charge from the second photoelectric converter 64. That is, the exposure in the second photoelectric converter 64 ends.

Simultaneously, at the clock time t146, the vertical drive unit 22 turns off the drive signal AGL to turn off the anti-blooming gate part 121 and release the reset of the first photoelectric converter 61. Thereby, exposure in the first photoelectric converter 61 is started.

The reason why the clock time of the start of the exposure in the first photoelectric converter 61 is later relative to the start of the exposure in the second photoelectric converter 64 is because it is envisaged that the distance to the target object that exists at a short distance is measured by the second photoelectric converter 64 whereas the distance to the target object that exists at a long distance is measured by the first photoelectric converter 61.

At a clock time t147, the vertical drive unit 22 turns on the drive signal TGL to turn on the first transfer gate part 62.

Thereby, the first photoelectric converter 61 and the FD part 63 are electrically connected and a charge obtained by photoelectric conversion in the first photoelectric converter 61 is transferred from the first photoelectric converter 61 to the FD part 63 via the first transfer gate part 62 and is accumulated.

At a clock time t148, the vertical drive unit 22 turns off the drive signal TGL to turn off the first transfer gate part 62 and end the transfer of the charge from the first photoelectric converter 61. That is, the exposure in the first photoelectric converter 61 ends.

Simultaneously, at the clock time t148, the vertical drive unit 22 turns off the drive signal RST to turn off the reset gate part 70 and release the reset of the node 81. In addition, the vertical drive unit 22 turns on the drive signal ABG to turn on the anti-blooming gate part 65 and reset the second photoelectric converter 64.

Moreover, at a clock time t149, the vertical drive unit 22 turns on the drive signal AGL to turn on the anti-blooming gate part 121 and reset the first photoelectric converter 61. By the above operations, emission of the flash high beam for ToF ranging and reception of reflected light of the flash high beam by the target object are carried out. These operations are carried out in all pixels 111 simultaneously.

Here, the purpose of setting the second photoelectric converter 64 and the first photoelectric converter 61 to the reset state at the clock time t148 and the clock time t149 is to prevent charges obtained by photoelectric conversion in these second photoelectric converter 64 and first photoelectric converter 61 from spilling over to the charge accumulating part 67 and the FD part 63 after the end of the exposure.

Furthermore, the exposure period of the second photoelectric converter 64 is a period T51 from the clock time t144 to the clock time t146 as described above. In contrast, the exposure period of the first photoelectric converter 61 is a period T52 from the clock time t146 to the clock time t148.

Here, suppose that the length of the period from the clock time t144 to the clock time 146, which is the emission period of the flash high beam, i.e. the emission time of the flash high beam, is 167 nsec for example. In this case, assuming that the speed c of light=299792458 m/second, the flash high beam travels by approximately 50 m in 167 nsec. Furthermore, suppose that the lengths of the period T51 and the period T52 are both 167 nsec.

In this case, in the second photoelectric converter 64, which has the period T51 as the exposure period, light of the flash high beam that returns after being reflected by a target object that exists at a distance of 0 to 25 m from the solid-state imaging element 11, i.e. the vehicle equipped with the in-vehicle sensor having the solid-state imaging element 11, can be received.

In contrast, in the first photoelectric converter 61, which has the period T52 as the exposure period, light of the flash high beam that returns after being reflected by a target object that exists at a distance of 25 to 50 m from the solid-state imaging element 11 can be received.

Thus, the distance from the solid-state imaging element 11 to the target object can be calculated by comparing the pixel signal obtained by exposure in the first photoelectric converter 61 (hereinafter, referred to also as large signal) and the pixel signal obtained by exposure in the second photoelectric converter 64 (hereinafter, referred to also as small signal) after correcting the sensitivity ratio in the signal processing unit 28 or the like for example.

Specifically, for example when the flash high beam emitted in a pulse manner at a timing indicated by an arrow W11 in the polygonal line L71 returns after being reflected by a target object whose distance from the solid-state imaging element 11 is 0 m, the reflected light is received at a timing indicated by an arrow W12. In this case, the amount of flash high beam component included in the small signal and the large signal when the light amount of emitted flash high beam is defined as 1, i.e. the allocation of the flash high beam component to the signal value of the small signal and the large signal is small signal:large signal=1:0.

Furthermore, when the flash high beam returns after being reflected by a target object that exists at a position of 12.5 m from the solid-state imaging element 11, the reflected light is received at a timing indicated by an arrow W13, and the allocation of the flash high beam at this time is small signal:large signal=0.5:0.5.

Moreover, when the flash high beam returns after being reflected by a target object that exists at a position of 25 m from the solid-state imaging element 11, the reflected light is received at a timing indicated by an arrow W14, and the allocation of the flash high beam at this time is small signal:large signal=0:1.

Similarly, when the flash high beam returns after being reflected by a target object that exists at a position of 37.5 m from the solid-state imaging element 11, the reflected light is received at a timing indicated by an arrow W15, and the allocation of the flash high beam at this time is small signal:large signal=0:0.5.

Furthermore, when the flash high beam returns after being reflected by a target object that exists at a position of 50 m from the solid-state imaging element 11, the reflected light is received at a timing indicated by an arrow W16, and the allocation of the flash high beam at this time is small signal:large signal=0:0.

As above, while the distance to the target object is from 0 to 50 m, the allocation of the flash high beam to the signal value of the small signal and the large signal changes linearly (in an analog manner). Therefore, the distance to the target object can be calculated by comparing the small signal and the large signal.

After the exposure in the first photoelectric converter 61 and the second photoelectric converter 64 to the flash high beam ends in the above-described manner, the vertical drive unit 22 selects the respective pixel rows in turn as the pixel row from which pixel signals are read out and reads out the pixel signal from each pixel 111.

Specifically, at a clock time t150, the vertical drive unit 22 turns on the drive signal RST to turn on the reset gate part 70. Furthermore, at the clock time t150, the vertical drive unit 22 turns on the drive signal SEL to turn on the selection transistor 72 and set the pixel 111 to the selected state.

At this time, the pixel 111 is in the state in which the charge transferred from the first photoelectric converter 61 at the time of exposure operation is accumulated in the FD part 63. Thus, a signal according to the amount of charge accumulated in the FD part 63, i.e. the amount of charge obtained by exposure in the first photoelectric converter 61, is output from the amplification transistor 71 to the column processing unit 23 via the selection transistor 72 and the vertical signal line 27. Due to this, the potential of the vertical signal line 27 changes according to the amount of charge accumulated in the FD part 63 as illustrated by the curve L80.

The column processing unit 23 reads the signal output from the amplification transistor 71 in this manner as the signal level of the pixel signal obtained by the exposure in the first photoelectric converter 61.

At a clock time t151, the vertical drive unit 22 turns on the drive signal FDG to turn on the third transfer gate part 68 and electrically connect the FD part 63 and the node 81. Thereby, the FD part 63 and the node 81 are reset.

At a clock time t152, the vertical drive unit 22 turns off the drive signal FDG to turn off the third transfer gate part 68 and electrically isolate the FD part 63 and the node 81.

In this case, in the state in which the FD part 63 has been reset, a signal according to the amount of charge accumulated in the FD part 63 is output from the amplification transistor 71 to the column processing unit 23 via the selection transistor 72 and the vertical signal line 27. Due to this, the potential of the vertical signal line 27 changes according to the amount of charge accumulated in the reset FD part 63 as illustrated by the curve L80.

The column processing unit 23 reads the signal output from the amplification transistor 71 in this manner as the reset level of the pixel signal obtained in the first photoelectric converter 61.

In the column processing unit 23, the pixel signal obtained by the exposure in the first photoelectric converter 61 is generated from the reset level and the signal level about the first photoelectric converter 61 obtained in the above.

At a clock time t153, the vertical drive unit 22 turns off the drive signal RST to turn off the reset gate part 70 and release the reset of the node 81. Furthermore, at a clock time t153, the vertical drive unit 22 turns off the drive signal AGL to turn off the anti-blooming gate part 121 and release the reset of the first photoelectric converter 61.

At a clock time t154, the vertical drive unit 22 turns on the drive signal FDG and the drive signal FCG to turn on the third transfer gate part 68 and the fourth transfer gate part 69. This makes the state in which the charge accumulating part 67, the node 81, and the FD part 63 are electrically connected.

In the charge accumulating part 67, the charge transferred from the second photoelectric converter 64 at the time of exposure operation is accumulated. Thus, when the charge accumulating part 67, the node 81, and the FD part 63 are electrically connected, the state in which the charge obtained by the exposure in the second photoelectric converter 64 is accumulated in these charge accumulating part 67, node 81, and FD part 63 is obtained.

Along with this, a signal according to the amount of charge accumulated in the charge accumulating part 67, the node 81, and the FD part 63 is output from the amplification transistor 71 to the column processing unit 23 via the selection transistor 72 and the vertical signal line 27. Due to this, the potential of the vertical signal line 27 changes according to the amount of charge accumulated in the charge accumulating part 67, the node 81, and the FD part 63 as illustrated by the curve L81.

The column processing unit 23 reads the signal output from the amplification transistor 71 in this manner as the signal level of the pixel signal obtained by the exposure in the second photoelectric converter 64.

At a clock time t155, the vertical drive unit 22 turns on the drive signal RST to turn on the reset gate part 70. Thereby, the charge accumulating part 67, the node 81, and the FD part 63 are reset. Then, at a clock time t156, the vertical drive unit 22 turns off the drive signal RST to turn off the reset gate part 70 and release the reset of the charge accumulating part 67, the node 81, and the FD part 63.

In this case, in the state in which the charge accumulating part 67, the node 81, and the FD part 63 have been reset, a signal according to the amount of charge accumulated in these charge accumulating part 67, node 81, and FD part 63 is output from the amplification transistor 71 to the column processing unit 23 via the selection transistor 72 and the vertical signal line 27. Due to this, the potential of the vertical signal line 27 changes according to the amount of charge accumulated in the charge accumulating part 67, the node 81, and the FD part 63 that are reset as illustrated by the curve L81.

The column processing unit 23 reads the signal output from the amplification transistor 71 in this manner as the reset level of the pixel signal obtained in the second photoelectric converter 64.

In the column processing unit 23, the pixel signal obtained by the exposure in the second photoelectric converter 64 is generated from the reset level and the signal level about the second photoelectric converter 64.

Then, the pixel signal (large signal) about the first photoelectric converter 61 and the pixel signal (small signal) about the second photoelectric converter 64 obtained in this manner are corrected based on the sensitivity ratio between the first photoelectric converter 61 and the second photoelectric converter 64.

At a clock time t157, the vertical drive unit 22 turns on the drive signal RST to turn on the reset gate part 70. In addition, the vertical drive unit 22 turns on the drive signal TGL and the drive signal TGS to turn on the first transfer gate part 62 and the second transfer gate part 66. Thereby, the first photoelectric converter 61, the second photoelectric converter 64, the charge accumulating part 67, the node 81, and the FD part 63 are reset.

Thereafter, at a clock time t158, the vertical drive unit 22 turns off the drive signal TGL and the drive signal TGS to turn off the first transfer gate part 62 and the second transfer gate part 66. Moreover, at a clock time t159, the vertical drive unit 22 turns off the drive signal RST to turn off the reset gate part 70. Thereby, the reset of the respective parts of the pixel 111 is released.

Then, at a clock time t160, the vertical drive unit 22 turns off the drive signal FCG to turn off the fourth transfer gate part 69. At a clock time t161, the vertical drive unit 22 turns off the drive signal FDG to turn off the third transfer gate part 68. This makes the state in which the charge accumulating part 67, the node 81, and the FD part 63 are electrically isolated.

Furthermore, at a clock time t161, the vertical drive unit 22 turns off the drive signal SEL to turn off the selection transistor 72 and cancel the selected state of the pixel 111.

When the large signal and the small signal at the time of emission of the flash high beam are obtained in the period T41 in the above-described manner, the solid-state imaging element 11 carries out the same operation as the period T41 in the subsequent period T42 to obtain a large signal and a small signal.

However, the flash high beam is not emitted (non-light-emission) in the period T42. Thus, the large signal and the small signal obtained in the period T42 are signals in which only the component of background light other than the flash high beam and the noise component are included.

Thus, the signal processing unit 28 calculates a large signal in which only the flash high beam component is included by subtracting the large signal obtained in the period T42 from the large signal obtained in the period T41. Similarly, the signal processing unit 28 calculates a small signal in which only the flash high beam component is included by subtracting the small signal obtained in the period T42 from the small signal obtained in the period T41.

If the large signal and the small signal in which only the flash high beam component is included, obtained in this manner, are compared, the distance to the target object can be calculated with higher accuracy and more surely.

In addition, in the solid-state imaging element 11, the ranging range can be made wider by using the first photoelectric converter 61 with higher sensitivity to detect a target object that exists at a long distance and using the second photoelectric converter 64 with lower sensitivity to detect a target object that exists at a short distance. Furthermore, by using the first photoelectric converter 61 with higher sensitivity to detect a target object that exists at a long distance, the performance of ranging to the target object that exists at a long distance can be improved.

Moreover, in the solid-state imaging element 11, setting the shutter speed extremely high can be avoided based on the sensitivity difference between the two photoelectric converters and control of the exposure time in these photoelectric converters when a normal photographed image is obtained, and the smoothness of a moving subject can be expressed.

It is to be noted that the example in which ranging is carried out by simultaneously carrying out exposures in the first photoelectric converter 61 and the second photoelectric converter 64 is described here. However, the ToF ranging described above can be implemented also by executing processing in a frame sequential manner by using one photoelectric converter and a region that is connected to the photoelectric converter and accumulates a charge. Thus, the ranging may be carried out by using only either one photoelectric converter.

For example, in the case of carrying out ToF ranging in a frame sequential manner, light emission and exposure for detecting a target object that exists at a distance of 0 to 25 m are carried out by using the first photoelectric converter 61 and subsequently light emission and exposure for detecting a target object that exists at a distance of 25 to 50 m are carried out by using the first photoelectric converter 61. It is to be noted that, in this case, whether the first photoelectric converter 61 with higher sensitivity is used or the second photoelectric converter 64 with a wider dynamic range is used is selected according to the surrounding environment and so forth, i.e. ambient light and so forth.

Moreover, in the divided frames subsequent to the period T42, photographing of a normal photographed image can be carried out by the driving described with reference to FIG. 5 and FIG. 6 and photographing of a photographed image in synchronization with a flash high beam can be carried out by the driving described with reference to FIG. 10.

For example, in the case of capturing a normal photographed image after the period T41 and the period T42, which are the first and second divided frames when the normal one-frame period is divided, it is preferable to employ four-frame sequential operation in which the normal photographed image is captured in the period from the third divided frame to the fourth divided frame to avoid the influence on the ranging.

However, it is also possible to shorten the operation to three-frame sequential operation by starting accumulation of a charge, i.e. exposure, from the end of reading of pixel signals from each pixel row of the second divided frame. That is, the photographed image can be obtained by the third divided frame.

In such a case, as photographing control of the photographed image, the operation of the start of non-linear burst driving of the second photoelectric converter 64 in the period T31 depicted in FIG. 10 and the subsequent operation, i.e. the operation from the clock time t94 to the clock time t111, is carried out after the reading of pixel signals in the second divided frame.

By the driving described above, acquisition of a normal photographed image, acquisition of a photographed image that is photographed by using a flash high beam as the illumination light source and is for recognizing a subject that exists at a long distance on the vehicle front side, and ToF ranging can be implemented by one solid-state imaging element 11. This can implement an in-vehicle sensor that is at lower cost and has higher functions.

<Configuration Example of Imaging Apparatus>

Moreover, the present technique can be applied to overall electronic equipment in which a solid-state imaging element is used for a photoelectric converter, such as pieces of imaging apparatus such as in-vehicle sensors, monitoring cameras, digital still cameras, and video cameras and pieces of portable terminal apparatus having an imaging function.

Figure 13:
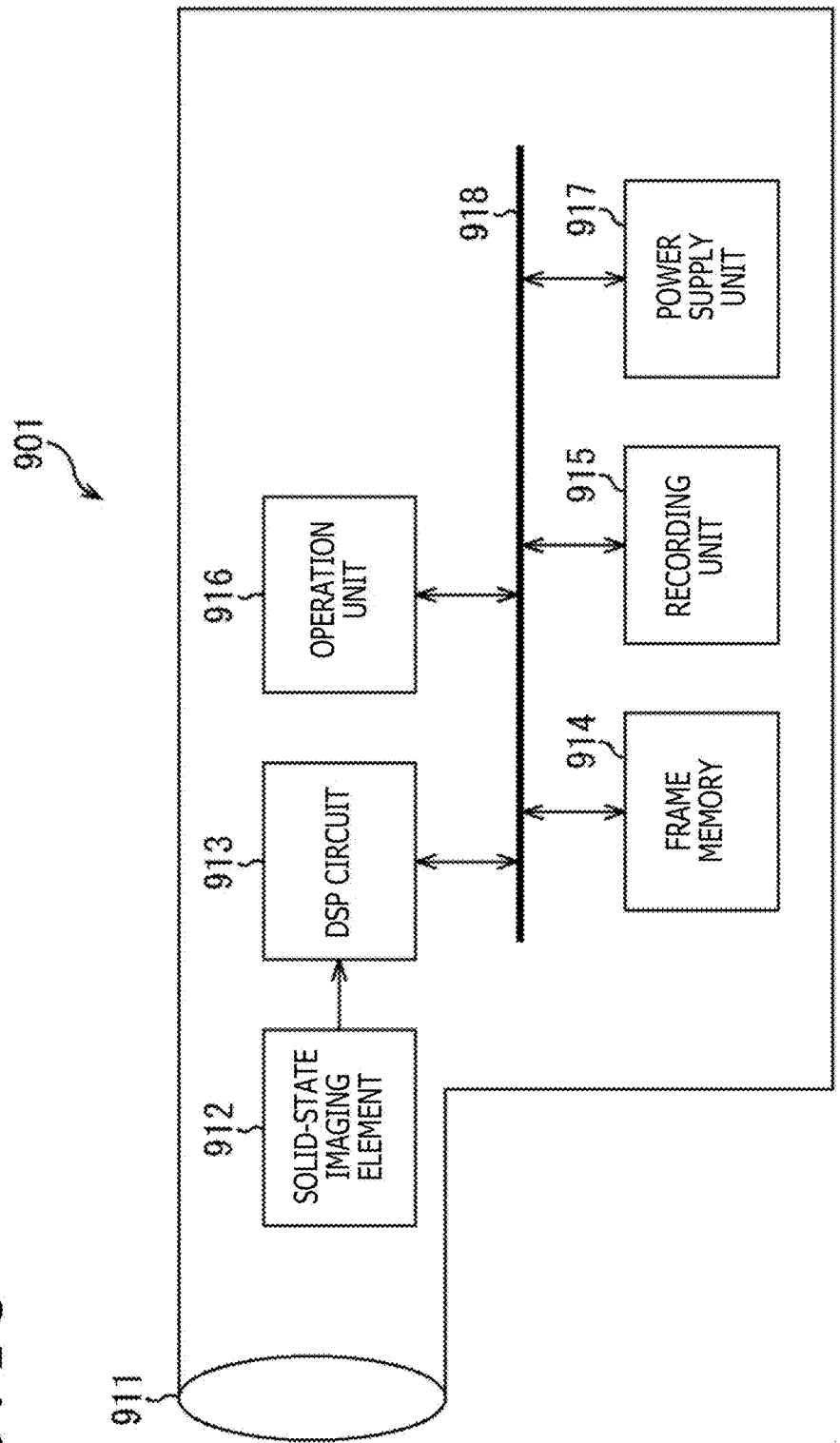
FIG. 13 is a diagram depicting a configuration example of imaging apparatus.

FIG. 13 is a diagram depicting a configuration example of imaging apparatus as electronic equipment to which the present technique is applied.

Imaging apparatus 901 of FIG. 13 includes an optical unit 911 composed of a lens group and so forth, a solid-state imaging element (imaging device) 912, and a DSP circuit 913 that is a camera signal processing circuit. Furthermore, the imaging apparatus 901 also includes a frame memory 914, a recording unit 915, an operation unit 916, and a power supply unit 917. The DSP circuit 913, the frame memory 914, the recording unit 915, the operation unit 916, and the power supply unit 917 are mutually connected through a bus line 918.

The optical unit 911 captures incident light (image light) from a subject and forms an image on an imaging surface of the solid-state imaging element 912. The solid-state imaging element 912 converts the light amount of incident light subjected to the image forming on the imaging surface by the optical unit 911 to an electrical signal in units of pixel and outputs the electrical signals as pixel signals. The solid-state imaging element 912 corresponds to the solid-state imaging element 11 depicted in FIG. 1.

The recording unit 915 records a moving image or a still image photographed by the solid-state imaging element 912 on a recording medium such as a video tape or a DVD (Digital Versatile Disk).

The operation unit 916 issues operation commands regarding various functions possessed by the imaging apparatus 901 under operation by a user. The power supply unit 917 provides various kinds of power supplies that serve as operating power supplies of the DSP circuit 913, the frame memory 914, the recording unit 915, and the output unit 916 to these provision targets as appropriate.

It is to be noted that, in the above-described embodiments, description is made by taking as an example the case in which the present technique is applied to a solid-state imaging element formed by disposing pixels that detect a signal according to the light amount of visible light in a matrix manner. However, the present technique is not limited to application to such a solid-state imaging element and can be applied to the overall solid-state imaging elements.

<Use Examples of Solid-State Imaging Element>

Figure 14:
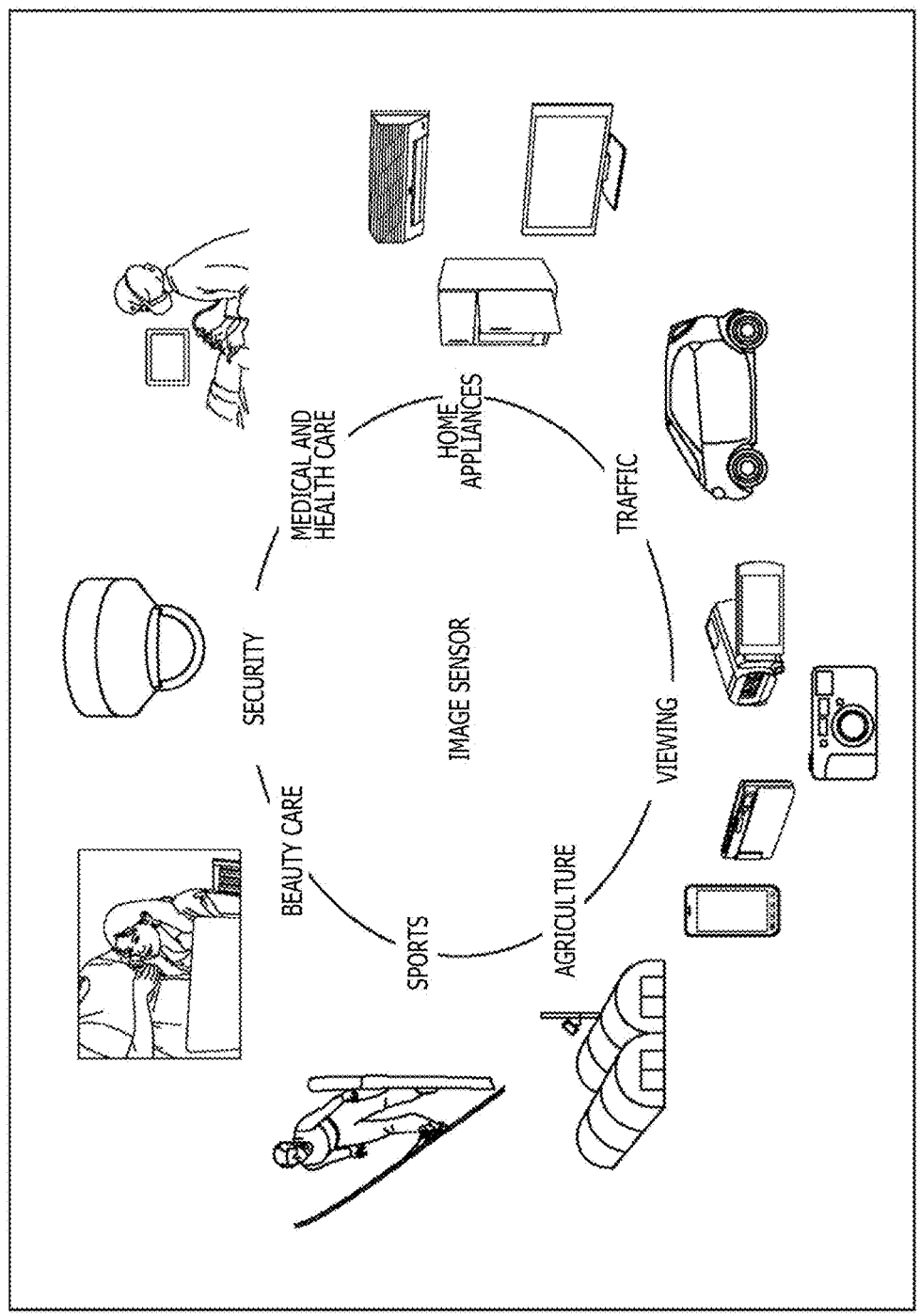
FIG. 14 is a diagram depicting use examples in which the solid-state imaging element is used.

FIG. 14 is a diagram depicting use examples in which the above-described solid-state imaging element (image sensor) is used.

The above-described solid-state imaging element can be used for various cases of sensing light such as visible light, infrared light, ultraviolet light, and X-ray as described below for example.

Pieces of apparatus that photograph images provided for use in viewing, such as digital cameras and portable equipment having a camera function Pieces of apparatus provided for use in traffic, such as in-vehicle sensors that photograph the front side and rear side of a car, the surroundings, the inside of the car, and so forth for safe driving such as automatic stop, recognition of the state of the driver, and so forth, monitoring cameras that monitor traveling vehicles and roads, and ranging sensors that carry out ranging between vehicles or the like Pieces of apparatus provided for home appliances such as TVs, refrigerators, and air conditioners in order to photograph gesture of a user and carry out equipment operation in accordance with the gesture Pieces of apparatus provided for use in medical and health care, such as endoscopes and apparatus that carries out blood vessel photographing by reception of infrared light Pieces of apparatus provided for use in security, such as monitoring cameras for anti-crime purposes and cameras for person authentication purposes Pieces of apparatus provided for use in beauty care, such as skin measurement instruments that photograph skin and microscopes that photograph skin of head Pieces of apparatus provided for use in sports, such as action cameras and wearable cameras for sports purposes Pieces of apparatus provided for use in agriculture, such as cameras for monitoring the state of fields and crops Furthermore, embodiments of the present technique are not limited to the above-described embodiments and various changes are possible in such a range as not to depart from the gist of the present technique.

Moreover, it is also possible for the present technique to employ the following configurations.

(1)

A solid-state imaging element including:

a pixel array unit in which a plurality of unit pixels are disposed; and a drive unit that controls operation of the unit pixel, in which the unit pixel has a plurality of photoelectric converters, and to one or a plurality of the photoelectric converters among the plurality of photoelectric converters, for each of the photoelectric converters, a transfer gate that transfers a charge obtained by photoelectric conversion in the photoelectric converter, a charge accumulating part that accumulates a charge transferred from the photoelectric converter via the transfer gate, and an anti-blooming gate part that resets the photoelectric converter are connected.

(2)

The solid-state imaging element according to (1), in which the drive unit carries out burst driving in which exposure operation of carrying out exposure of the photoelectric converter after resetting the photoelectric converter and transfer operation of transferring a charge obtained by the exposure to the charge accumulating part are repeated a plurality of times in a one-frame period regarding the one or plurality of the photoelectric converters.

(3)

The solid-state imaging element according to (2), in which the drive unit carries out the burst driving while changing an exposure time in the exposure operation.

(4)

The solid-state imaging element according to (2) or (3), in which the drive unit controls exposure of the photoelectric converter that does not carry out the burst driving in such a manner that a centroid position of the plurality of times of the exposure by the burst driving substantially corresponds with a centroid position of the exposure of the photoelectric converter that does not carry out the burst driving.

(5)

The solid-state imaging element according to any one of (1) to (4), in which the drive unit controls exposure of the photoelectric converter in such a manner that the exposure of the photoelectric converter synchronizes with light emission of a predetermined pulse light source.

(6)

The solid-state imaging element according to (1), in which the drive unit controls ranging by a time-of-flight measurement method by controlling exposure of the photoelectric converter based on a light emission timing of a predetermined pulse light source.

(7)

The solid-state imaging element according to (6), in which the drive unit controls exposure of the photoelectric converter in such a manner that a target object that exists at a shorter distance is detected by the photoelectric converter with lower sensitivity and a target object that exists at a longer distance is detected by the photoelectric converter with higher sensitivity.

(8)

A driving method of a solid-state imaging element including a pixel array unit in which a plurality of unit pixels are disposed, and a drive unit that controls operation of the unit pixel, the unit pixel having a plurality of photoelectric converters, to one or a plurality of the photoelectric converters among the plurality of photoelectric converters, for each of the photoelectric converters, a transfer gate that transfers a charge obtained by photoelectric conversion in the photoelectric converter, a charge accumulating part that accumulates a charge transferred from the photoelectric converter via the transfer gate, and an anti-blooming gate part that resets the photoelectric converter being connected, the driving method including:

a step in which the drive unit carries out burst driving in which exposure operation of carrying out exposure of the photoelectric converter after resetting the photoelectric converter and transfer operation of transferring a charge obtained by the exposure to the charge accumulating part are repeated a plurality of times in a one-frame period regarding the one or plurality of the photoelectric converters.

(9)

Electronic equipment including:

a solid-state imaging element including a pixel array unit in which a plurality of unit pixels are disposed, and a drive unit that controls operation of the unit pixel, in which the unit pixel has a plurality of photoelectric converters, and to one or a plurality of the photoelectric converters among the plurality of photoelectric converters, for each of the photoelectric converters, a transfer gate that transfers a charge obtained by photoelectric conversion in the photoelectric converter, a charge accumulating part that accumulates a charge transferred from the photoelectric converter via the transfer gate, and an anti-blooming gate part that resets the photoelectric converter are connected.

REFERENCE SIGNS LIST

11 Solid-state imaging element, 21 Pixel array unit, 22 Vertical drive unit, 23 Column processing unit, 51 Pixel, 61 First photoelectric converter, 62 First transfer gate part, 63 FD part, 64 Second photoelectric converter, 65 Anti-blooming gate part, 66 Second transfer gate part, 67 Charge accumulating part, 68 Third transfer gate part, 111 Pixel, 121 Anti-blooming gate part

The invention claimed is:

1. A solid-state imaging element comprising:

a pixel array unit in which a plurality of unit pixels are disposed; and a drive unit that controls operation of the unit pixel, wherein the unit pixel has a plurality of photoelectric converters, and for each of the photoelectric converters:

a transfer gate that transfers a charge obtained by photoelectric conversion in the photoelectric converter, a charge accumulating part that accumulates a charge transferred from the photoelectric converter via the transfer gate, and an anti-blooming gate part that resets the photoelectric converter are connected;

wherein the drive unit carries out burst driving in which exposure operation of carrying out exposure of the photoelectric converter after resetting the photoelectric converter and transfer operation of transferring a charge obtained by the exposure to the charge accumulating part are repeated a plurality of times in a one-frame period regarding the one or plurality of the photoelectric converters, and the drive unit controls exposure of the photoelectric converter that does not carry out the burst driving in such a manner that a centroid position of the plurality of times of the exposure by the burst driving substantially corresponds with a centroid position of the exposure of the photoelectric converter that does not carry out the burst driving.

2. The solid-state imaging element according to claim 1, wherein the drive unit carries out the burst driving while changing an exposure time in the exposure operation.

3. The solid-state imaging element according to claim 1, wherein the drive unit controls exposure of the photoelectric converter in such a manner that the exposure of the photoelectric converter synchronizes with light emission of a predetermined pulse light source.

4. The solid-state imaging element according to claim 1, wherein the drive unit controls ranging by a time-of-flight measurement method by controlling exposure of the photoelectric converter based on a light emission timing of a predetermined pulse light source.

5. The solid-state imaging element according to claim 4, wherein
the drive unit controls exposure of the photoelectric converter in such a manner that a target object that exists at a shorter distance is detected by the photoelectric converter with lower sensitivity and a target object that exists at a longer distance is detected by the photoelectric converter with higher sensitivity.

6. A driving method of a solid-state imaging element including
a pixel array unit in which a plurality of unit pixels are disposed, and
a drive unit that controls operation of the unit pixel,
the unit pixel having a plurality of photoelectric converters,
for each of the photoelectric converters:
a transfer gate that transfers a charge obtained by photoelectric conversion in the photoelectric converter,
a charge accumulating part that accumulates a charge transferred from the photoelectric converter via the transfer gate, and
an anti-blooming gate part that resets the photoelectric converter
being connected,
the driving method comprising:
a step in which the drive unit carries out burst driving in which exposure operation of carrying out exposure of the photoelectric converter after resetting the photoelectric converter and transfer operation of transferring a charge obtained by the exposure to the charge accumulating part are repeated a plurality of times in a one-frame period regarding the one or plurality of the photoelectric converters and the drive unit controls exposure of the photoelectric converter that does not carry out the burst driving in such a manner that a centroid position of the plurality of times of the exposure by the burst driving substantially corresponds with a centroid position of the exposure of the photoelectric converter that does not carry out the burst driving.

7. Electronic equipment comprising:
a solid-state imaging element including
a pixel array unit in which a plurality of unit pixels are disposed, and
a drive unit that controls operation of the unit pixel, wherein
the unit pixel has a plurality of photoelectric converters, and
for each of the photoelectric converters:
a transfer gate that transfers a charge obtained by photoelectric conversion in the photoelectric converter,
a charge accumulating part that accumulates a charge transferred from the photoelectric converter via the transfer gate, and
an anti-blooming gate part that resets the photoelectric converter
are connected;
wherein the drive unit carries out burst driving in which exposure operation of carrying out exposure of the photoelectric converter after resetting the photoelectric converter and transfer operation of transferring a charge obtained by the exposure to the charge accumulating part are repeated a plurality of times in a one-frame period regarding the one or plurality of the photoelectric converters, and the drive unit controls exposure of the photoelectric converter that does not carry out the burst driving in such a manner that a centroid position of the plurality of times of the exposure by the burst driving substantially corresponds with a centroid position of the exposure of the photoelectric converter that does not carry out the burst driving.

* * * * *